US012097622B2

(12) United States Patent
Goyal et al.

(10) Patent No.: US 12,097,622 B2
(45) Date of Patent: Sep. 24, 2024

(54) REPEATING PATTERN DETECTION WITHIN USAGE RECORDINGS OF ROBOTIC PROCESS AUTOMATION TO FACILITATE REPRESENTATION THEREOF

(71) Applicant: Automation Anywhere, Inc., San Jose, CA (US)

(72) Inventors: Ranjna Garg Goyal, Santa Clara, CA (US); Niraj Radhakrishnan Kunnumma, Bengaluru (IN)

(73) Assignee: Automation Anywhere, Inc., San Jose, CA (US)

(*) Notice: Subject to any disclaimer, the term of this patent is extended or adjusted under 35 U.S.C. 154(b) by 643 days.

(21) Appl. No.: 17/389,300

(22) Filed: Jul. 29, 2021

(65) Prior Publication Data

US 2023/0052190 A1   Feb. 16, 2023

(51) Int. Cl.
*G06Q 10/0633* (2023.01)
*B25J 9/16* (2006.01)

(52) U.S. Cl.
CPC ........ *B25J 9/1674* (2013.01); *G06Q 10/0633* (2013.01)

(58) Field of Classification Search
None
See application file for complete search history.

(56) References Cited

U.S. PATENT DOCUMENTS 5,949,999 A   9/1999   Song et al.
5,983,001 A   11/1999  Boughner et al.
(Continued)

FOREIGN PATENT DOCUMENTS

EP   3133539 A1 *  2/2017  ............ B25J 9/1656
EP   3675008 A1 *  7/2020  .......... G06F 11/3438
(Continued)

OTHER PUBLICATIONS

Vahid et al "An Approach to Robot Task Learning and Planning with Loops", Sep. 2017, ResearchGate, pp. 1-7 (Year: 2017).*
(Continued)

*Primary Examiner* — Romain Jeanty

(57) ABSTRACT

Improved techniques for examining a plurality of distinct recordings pertaining to user interactions with one or more software applications, where each recording concerns performing at least one task. The examined recordings can be processed such that the recordings can be organized and/or rendered in a consolidated manner which facilitates user's understanding of higher-level operations being performed by the examined recordings to carry out the associated task. As one embodiment, a robotic process automation system can, for example, operate to: acquire a plurality of recordings, the recordings include a series of user interactions with one or more application programs, the recordings being acquired via the robotic process automation system; identify repeating sequences of user interactions within the recordings; select at least one of the identified repeating sequences that occurs more often; create a first level pattern for the selected at least one of the identified repeating sequences; and associate a descriptive label to the first level pattern created for the selected at least one of the identified repeating sequences.

22 Claims, 18 Drawing Sheets

(56) References Cited

U.S. PATENT DOCUMENTS

| | | |
|---|---|---|
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,783,135 B2 | 8/2010 | Gokturk |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Folev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 8,966,458 B2 | 2/2015 | Asai |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,251,413 B2 | 2/2016 | Meler |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,934,063 B2 | 4/2018 | Kania |
| 9,934,129 B1 | 4/2018 | Budurean |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,592,738 B2 | 3/2020 | Northrup |
| 10,654,166 B1 | 5/2020 | Hall |
| 10,706,218 B2 | 7/2020 | Milward et al. |
| 10,706,228 B2 | 7/2020 | Buisson |
| 10,713,068 B1 | 7/2020 | Zohar |
| 10,936,807 B1 | 3/2021 | Walters |
| 11,099,972 B2 | 8/2021 | Puszkiewicz |
| 11,176,443 B1 | 11/2021 | Selva |
| 11,182,178 B1 | 11/2021 | Singh et al. |
| 11,182,604 B1 | 11/2021 | Methaniya |
| 11,243,803 B2 | 2/2022 | Anand et al. |
| 11,263,391 B2 | 3/2022 | Potts |
| 11,348,353 B2 | 5/2022 | Sundell et al. |
| 11,494,227 B2 * | 11/2022 | George ............... G06F 9/4881 |
| 11,604,663 B2 | 3/2023 | Singh et al. |
| 11,614,731 B2 | 3/2023 | Anand et al. |
| 11,775,321 B2 | 10/2023 | Singh et al. |
| 11,775,339 B2 | 10/2023 | Anand et al. |
| 11,775,814 B1 | 10/2023 | Anand et al. |
| 11,782,734 B2 | 10/2023 | Ginoya et al. |
| 11,820,020 B2 | 11/2023 | Goyal et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0110382 A1 | 6/2003 | Leporini |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0089101 A1 | 4/2007 | Romanovskiy |
| 2007/0101291 A1 | 5/2007 | Forstall et al. |
| 2007/0112574 A1 | 5/2007 | Greene |
| 2007/0156677 A1 | 7/2007 | Szabo |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0077475 A1 | 3/2010 | Deschenes |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2010/0275113 A1 | 10/2010 | Santos |
| 2011/0022578 A1 | 1/2011 | Folev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258550 A1 | 10/2011 | Dinh-Trong |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |

(56) References Cited

U.S. PATENT DOCUMENTS

| | | |
|---|---|---|
| 2012/0324333 A1 | 12/2012 | Lehavi |
| 2012/0330940 A1 | 12/2012 | Caire et al. |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0332511 A1 | 12/2013 | Hala |
| 2013/0332524 A1 | 12/2013 | Fiala |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0379666 A1 | 12/2014 | Bryon |
| 2015/0082280 A1 | 3/2015 | Betak et al. |
| 2015/0235193 A1 | 8/2015 | Cummings |
| 2015/0301926 A1 | 10/2015 | Giannelos |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0270431 A1 | 9/2017 | Hosabettu |
| 2018/0113781 A1 | 4/2018 | Kim |
| 2018/0210824 A1 | 7/2018 | Kochura |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0322403 A1 | 11/2018 | Ron |
| 2018/0349730 A1 | 12/2018 | Dixon |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0114370 A1 | 4/2019 | Cerino |
| 2019/0126463 A1 | 5/2019 | Purushothaman |
| 2019/0141596 A1 | 5/2019 | Gay |
| 2019/0188462 A1 | 6/2019 | Nishida |
| 2019/0205636 A1 | 7/2019 | Saraswat |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0097742 A1 | 3/2020 | Kumar et al. |
| 2020/0104350 A1 | 4/2020 | Allen |
| 2020/0125635 A1 | 4/2020 | Nuolf |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0249964 A1 | 8/2020 | Fernandes |
| 2020/0273078 A1 | 8/2020 | Xu |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2021/0049128 A1 | 2/2021 | Kernick |
| 2021/0107140 A1 | 4/2021 | Singh |
| 2021/0141497 A1 | 5/2021 | Magureanu |
| 2021/0216334 A1 | 7/2021 | Barrett |
| 2021/0279166 A1 | 9/2021 | Peng |
| 2021/0333983 A1 | 10/2021 | Singh et al. |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |

FOREIGN PATENT DOCUMENTS

| | | |
|---|---|---|
| WO | 2019/092672 A2 | 5/2019 |
| WO | 2022/076488 | 4/2022 |

OTHER PUBLICATIONS

Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Non-Final Office Action for U.S. Appl. No. 17/160,084, mailed Aug. 10, 2023.
Non-Final Office Action for U.S. Appl. No. 17/528,119, mailed Sep. 8, 2022.
Notice of Allowance for U.S. Appl. No. 17/528,119, mailed Nov. 25, 2022.
Final Office Action for U.S. Appl. No. 17/463,494, mailed Sep. 6, 2023.
Non-Final Office Action for U.S. Appl. No. 17/160,080, mailed Sep. 11, 2023.
Final Office Action for U.S. Appl. No. 17/994,249 mailed Sep. 13, 2023.
Final Office Action for U.S. Appl. No. 17/534,249 mailed Sep. 13, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Final Office Action for U.S. Appl. No. 17/139,842, mailed Dec. 29, 2023.
Notice of Allowance for U.S. Appl. No. 18/126,935, mailed Jan. 10, 2024.
Notice of Allowance for U.S. Appl. No. 17/463,494, mailed Jan. 16, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Non-Final Office Action for U.S. Appl. No. 17/160,082, mailed Feb. 15, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.
Non-Final Office Action for U.S. Appl. No. 18/094,305, mailed May 9, 2024.
Al Sallami, Load Balancing in Green Cloud Computation, Proceedings of the World Congress on Engineering 2013 vol. II, WCE 2013, 2013, pp. 1-5 (Year: 2013).
B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).

(56) References Cited

OTHER PUBLICATIONS

Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on mobile device, May 2010, 7 pages.
Non-Final Office Action for U.S. Appl. No. 17/230,492, mailed Oct. 14, 2022.
Notice of Allowance for U.S. Appl. No. 16/398,532, mailed Oct. 23, 2022.
Non-Final Office Action for U.S. Appl. No. 16/876,530, mailed Sep. 29, 2020.
Final Office Action for U.S. Appl. No. 16/876,530, mailed Apr. 13, 2021.
Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
Notice of Allowance for US Patent Application No. 16/398, 532, mailed Oct. 23, 2022.
Ren, Shaoqing et al., "Faster r-cnn: Towards real0time object detection with region proposal network." Advances in neutral information processing systems 28 (2015). (Year: 2015).
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Jul. 8, 2022.
Non-Final Office Action for U.S. Appl. No. 17/139,838, mailed Feb. 22, 2022.
Final Office Action for U.S. Appl. No. 17/139,838, mailed Nov. 15, 2023.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Muhammad et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.

\* cited by examiner

REPEATING PATTERN DETECTION WITHIN USAGE RECORDINGS OF ROBOTIC PROCESS AUTOMATION TO FACILITATE REPRESENTATION THEREOF

CROSS-REFERENCE TO RELATED APPLICATION

This application is related to U.S. patent application Ser. No. 17/389,304, filed Jul. 29, 2021, and entitled "ROBOTIC PROCESS AUTOMATION SUPPORTING HIERARCHICAL REPRESENTATION OF RECORDINGS," which is hereby incorporated herein by reference.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

RPA systems generally assist users in creating software robots that mimic user interactions with software applications to perform various tasks. Inevitably, the user is performing a task by interacting with one or more software applications. The various user interactions with software applications to perform tasks can be captured in recordings. However, these recordings are captured at the click-level and thus are low-level actions. As such, it is difficult for users to understand what is taking place and how a series of such low-level actions might be used by a software robot to carry out a task.

Additionally, if a software robot is formed to carry out a task, its creation is not straight forward because the user interactions for a given task, even though generally repeated, can often have slight variances. As such, creation of a software robot to perform these same tasks conventionally requires significant user effort to first understand the low-level actions within recordings and then create a software robot to automate the same tasks, which also conventionally requires some knowledge about creating software robots and possibly even some programming knowledge.

Therefore, there is a need for improved approaches to examine recordings of user interactions and to organize steps within the recordings to facilitate recognition of repetitive tasks in the recordings.

SUMMARY

Embodiments disclosed herein concern improved techniques for examining a plurality of distinct recordings pertaining to user interactions with one or more software applications, where each recording concerns performing at least one task. The examined recordings can be processed such that the recordings can be organized and/or rendered in a consolidated manner. The consolidated representations of the examined recordings facilitate a user's understanding of higher-level operations being performed by the examined recordings, such as carrying out an associated task.

The improved techniques enable a RPA system to recognize and represent repetitive tasks within multiple recordings as multi-level patterns of steps, sub-tasks, or some combination thereof. The multi-level arranged recordings can be used to form a hierarchical representation of the recordings so that users can better understand and visualize what tasks or sub-tasks are being carried out at each portion of the recordings. The RPA system can identify patterns within recordings that often repeat and can define patterns to facilitate locating such patterns within recordings and can also accommodate variants in such patterns. By doing so, a RPA system can better understand and visualize how or what software robots can be created to automate the same sub-tasks or tasks, and thus facilitate creation of software robots to automate the same tasks or sub-tasks.

Advantageously, the improved techniques enable a RPA system to organize and/or combine recordings into a multi-level (e.g., hierarchical) representation so that recordings can be visualized in a more user-friendly manner, equivalent recordings can be recognized, and/or software automation processes can be formed to perform repetitive steps in an automated manner, all with little or no assistance from a user. Embodiments can also provide enhanced visualization with multi-level organization of repeating patterns in recordings.

The invention can be implemented in numerous ways, including as a method, system, device, apparatus (including computer readable medium and graphical user interface). Several embodiments of the invention are discussed below.

As a computer-implemented method for identifying and representing common user interactions with one or more application programs for use in an robotic process automation system, one embodiment can, for example, include at least: acquiring a plurality of recordings, the recordings include a series of user interactions with one or more application programs, the recordings being acquired via the robotic process automation system; identifying repeating sequences of user interactions within the recordings; selecting at least one of the identified repeating sequences that occurs more often; creating a first level pattern for the selected at least one of the identified repeating sequences; and associating a descriptive label to the first level pattern created for the selected at least one of the identified repeating sequences.

As a non-transitory computer readable medium including at least computer program code stored thereon for identifying and representing common user interactions with one or more application programs for use in an robotic process automation system, one embodiment can, for example, include at least: computer program code for acquiring a plurality of recordings, the recordings include a series of user interactions with one or more application programs, the recordings being acquired via the robotic process automation system; computer program code for identifying repeating sequences of user interactions within the recordings; computer program code for selecting at least one of the identified repeating sequences based on selection criteria; computer program code for creating a first level pattern for the at least one of the identified repeating sequences within the at least one of the identified repeating sequences; and computer program code for associating a descriptive label to the first level patterns for each of the at least one identified repeating sequence.

As a computer-implemented method for rendering a sequence of user specified interaction events with one or more application programs operating on one or more computing devices, one embodiment can, for example, include at least: examining a plurality of sequences of user specified interaction events with one or more application programs to identify sub-sequences of user specified interaction events that are present within two or more of the plurality of sequences of user specified interaction events; associating labels to the sub-sequences of user specified interaction events that match; and presenting a visual representation of one or more of the plurality of sequences of user specified interaction events, wherein the visual representation of the one or more of the plurality of sequences of user specified interaction events being presented includes at least one of the labels to the sub-sequences of user specified interaction events.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1:
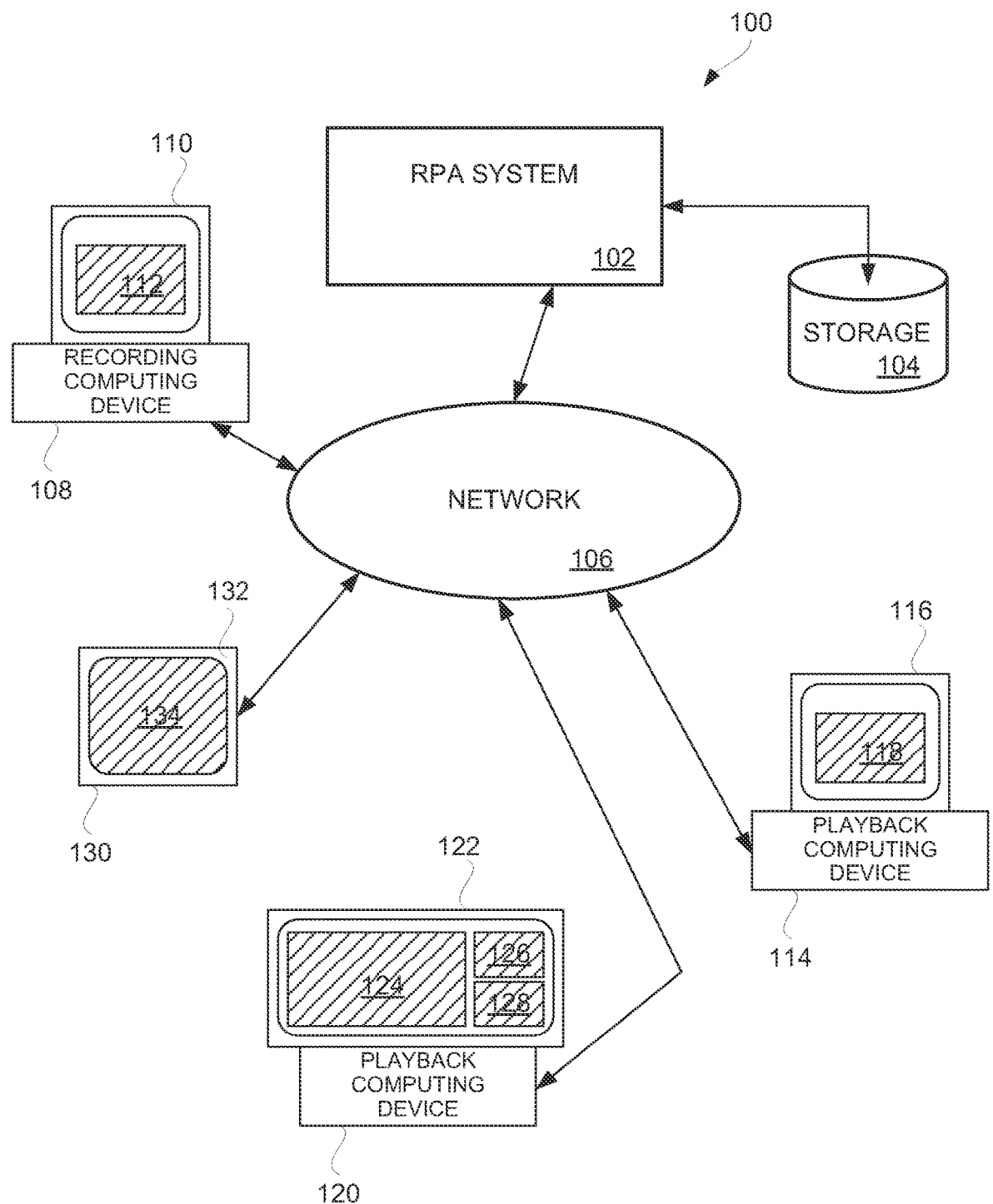
FIG. 1 is a block diagram of a computing environment according to one embodiment.

Embodiments disclosed herein concern improved techniques for examining a plurality of distinct recordings pertaining to user interactions with one or more software applications, where each recording concerns performing at least one task. The examined recordings can be processed such that the recordings are organized and/or rendered in a consolidated manner. The consolidated representations of the examined recordings help facilitate a user's understanding of higher-level operations being performed by the examined recordings, such as carrying out an associated task.

The improved techniques enable a RPA system to recognize and represent repetitive tasks within multiple recordings as multi-level patterns of steps, sub-tasks, or some combination thereof. The multi-level arranged recordings can be used to form a hierarchical representation of the recordings so that users can better understand and visualize what tasks or sub-tasks are being carried out at each portion of the recordings. The RPA system can identify patterns within recordings that often repeat and can define patterns to facilitate locating such patterns within recordings and can also accommodate variants in such patterns. By doing so, a RPA system can better understand and visualize how or what software robots can be created to automate the same subtasks or tasks, and thus facilitate creation of software robots to automate the same tasks or sub-tasks.

Advantageously, the improved techniques enable a RPA system to organize and/or combine recordings into a multi-level (e.g., hierarchical) representation so that recordings can be visualized in a more user-friendly manner, equivalent recordings can be recognized, and/or software automation processes can be formed to perform repetitive steps in an automated manner, all with little or no assistance from a user. Embodiments can also provide enhanced visualization with multi-level organization of repeating patterns in recordings.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes (SAPs). The RPA systems also provide for creation, configuration, management, execution, monitoring, and performance of SAPs.

A SAP can also be referred to as a software robot, a software agent, or a bot. A SAP can interpret and execute tasks on a user's behalf. SAPs are particularly well suited for handling a lot of the repetitive tasks that humans perform every day. SAPs can perform a task, or workflow they are tasked with, once or 10,000 times and do it consistently and reliably every time. As one example, a SAP can locate and read data in a document, email, file, or window. As another example, a SAP can connect with one or more Enterprise Resource Planning (ERP), Customer Relations Management (CRM), core banking, and other business systems to distribute data where it needs to be in whatever format is necessary. As another example, a SAP can perform data tasks, such as reformatting, extracting, balancing, error checking, moving, copying, and any other desired tasks. As another example, a SAP can grab data desired from a webpage, application, screen, file, or other data source. As still another example, a software automation process can be triggered based on time or an event, and can serve to take files or data sets and move them to another location, whether it is to a customer, vendor, application, department, or storage. These various capabilities can also be used in any combination. As an example of an integrated SAP, the SAP can start a task or workflow based on a trigger, such as a file being uploaded to a file transfer protocol (FTP) system. The integrated SAP can then download that file, scrape relevant data from it, upload the relevant data to a database, and send an email to inform the recipient that the data has been successfully processed.

Embodiments of various aspects of the invention are discussed below with reference to FIGS. 1-14. However, those skilled in the art will readily appreciate that the detailed description given herein with respect to these figures is for explanatory purposes as the invention extends beyond these limited embodiments.

FIG. 1 is a block diagram of a computing environment 100 according to one embodiment. The computing environment 100 includes a RPA system 102. The RPA system 102 can be coupled to storage 104 for storage of recordings of user interactions and SAPs (e.g., bots).

The computing environment 100 can support various different types of computing devices that can interact with the RPA system 102. The computing environment 100 can also include a network 106 made up of one or more wired or wireless networks that serve to electronically interconnect various computing devices, such as for data transfer. These computing devices can be, for example, a recording computing device, a playback computing device, or both, or any other computing devices. As shown in FIG. 1, the computing environment 100 can include a recording computing device 108 that includes a display device 110 and a window 112 presented on the display device 110. The window 112 can, in one example, depict a user interface that is associated with recording user interactions with one or more application programs. Each recording can be examined, such as by the RPA system 102, and modified to provide a multi-level representation. The modified recordings can then be presented (e.g., displayed) for a user and/or can be used to produce software automation processes.

In the simplified block diagram shown in FIG. 1, the RPA system 102 supports one or more recording sessions. As an example, FIG. 1 illustrates that the RPA system 102 can receive or include recording sessions, such as recordings acquired via the recording computing device 108. Each recording denotes a series of user interactions with one or more application programs operating on a computing device, which can be recorded and stored (or received and stored) by storage 104.

In general, a recording is an electronic record of a series of user interactions, such as actions or events, with one or more software programs operating on one or more computing devices. More generally, the user interactions within a recording are referred to as "steps". In one implementation, these steps can also be referred to as "click events". The recording can be stored in an electronic file. The data stored within the electronic file can denote the order in which the user interactions occurred. The electronic file can, for example, use a structured format, such as a JavaScript Object Notation (JSON) format, to detail the data within the recording. JSON is a standard text-based format for representing structured data based on JavaScript object syntax.

The computing environment 100 shown in FIG. 1 also includes various playback computing devices. A first playback computing device 114 includes a display device 116 that can present a window 118. A second playback computing device 120 includes a display device 122 that can present a first window 124, a second window 126 and a third window 128. The number of windows is not intended to be limiting and can be any number of windows desired by the user and/or to complete the desired task. A third playback computing device 130 includes a display device 132 that can present a window 134. More generally, the windows are screens that are presented and visible on respective display devices. Often the windows are produced by software programs, such as application programs or operating systems.

The computing environment 100 serves to support recordation of a series of user interactions of a user with one or more software programs operating on a computing device, such as the recording computing device 108. In the case that distinct recordings pertain to or include same or similar tasks or sub-tasks, the recordings can be organized in a multi-level (e.g., hierarchical) manner to yield consolidated recordings. Such consolidated recordings can permit the RPA system 102 to better assist users in visualizing the recordings. By discovering and defining patterns, the RPA system 102 is then able to process subsequent recordings such that these same patterns can be discovered in an automated manner. Using the consolidated recordings, the RPA system 102 can optionally also create SAPs, with little or no assistance from users. The RPA system 102, using any created SAPs, can subsequently provide programmatic playback of the consolidated recordings with the same one or more software programs operating on the same or different computing device. For example, the programmatic playback can be performed on the first playback computing device 114, the second playback computing device 120, and the third playback computing device 130. Programmatic playback refers to the notion that the playback is undertaken by a computer program, as opposed to a user.

The RPA system 102 supports not only recording, storing and modifying recordings but also creation, storage and execution of SAPs. These SAPs can be referred to as "software robots" or "bots".

The consolidated recording can be used by the RPA system 102 to create a SAP. The series of user interactions from a plurality of recordings can be modified based on patterns and then utilized by the RPA system 102 to form a SAP (e.g., bot) for carrying out tasks in an automated manner. The computing environment 100 can include storage 104 for storage of the SAPs (e.g., bots) that were created.

In addition, the RPA system 102 can further support the execution of the one or more SAPs that have been created by the RPA system 102 and stored in storage 104. Execution (or running) of a SAP at a computing device (i.e., first playback computing device 114, second playback computing device 120, or third playback computing device 130) can cause playback of the SAP. That is, when a SAP is executed or run by one or more computing devices (i.e., first playback computing device 114, second playback computing device 120, or third playback computing device 130), the SAP is being "played back" or undergoing "playback." The RPA system 102 can support the execution of a SAP in any of a plurality of different playback sessions. These playback sessions can each execute the same or different SAPs.

Figure 2:
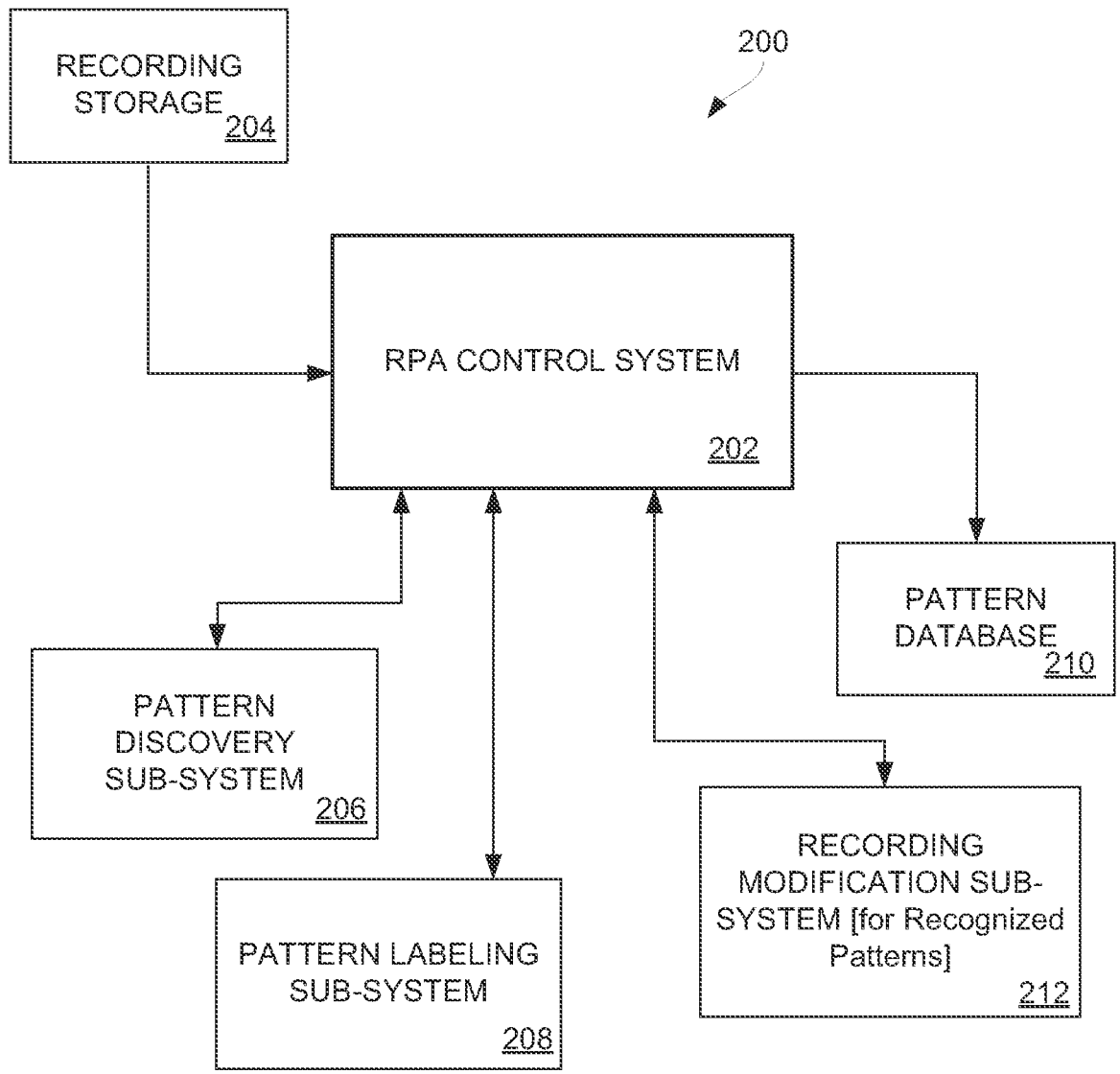
FIG. 2 is a block diagram of a RPA system according to one embodiment.

FIG. 2 is a block diagram of a RPA system 200 according to one embodiment. The RPA system 200 is, for example, suitable for use as the RPA system 102 illustrated in FIG. 1.

The RPA system 200 includes an RPA control system 202 that manages the operation of the RPA system 200. The RPA control system 202 has access to recordings that have been previously stored in recording storage 204. The RPA system 200 can also include various sub-systems to perform various different processing objectives. In this regard, the RPA system 200 includes a pattern discovery sub-system 206. The pattern discovery sub-system 206 can analyze a plurality of recordings stored in the recording storage 204 to identify patterns within the recordings that represent commonly repeated patterns of steps, within the recordings. The recordings are typically implementing tasks or sub-tasks of a process a user desires to be repeatedly performed. Another sub-system within the RPA system 200 is a pattern labeling sub-system 208. After the pattern discovery sub-system 206 has identified one or more patterns within the recordings, the pattern labeling sub-system 208 can, automatically or with user assistance, provide a label to represent each of the one or more patterns that have been identified. Typically, the patterns identified within the recordings are concerned with carrying out various steps that together complete a task or sub-task. An assigned label to the corresponding pattern can be descriptive of the sub-task that is carried out by the various steps within the recordings that are associated with the pattern. In another embodiment, an assigned label can denote an order of the tasks performed by the user.

The one or more patterns identified by the pattern discovery sub-system 206 can also be stored to a pattern database 210. The patterns can be stored in the pattern database 210 using a computer readable format. The patterns can be stored in a structured format that can be understood by a computer and/or person. For example, in one implementation, the patterns can be stored in a JSON format, which is a lightweight data-interchange text-based format.

Another sub-system within the RPA system 200 can be a recording modification sub-system 212. The recording modification sub-system 212 serves to process a recording to locate one or more patterns within the recording that match previously determined patterns that have been identified and defined by the pattern discovery sub-system 206. In addition, the recording modification sub-system 206 can modify the recording in view of the one or more patterns found within the recording. The modifications to the recording can result in the recording being organized into a multi-level (e.g., hierarchical) arrangement. For example, an identified pattern that has been appropriately labeled can be represented in the modified recording by a designator, such as a label. The designator (e.g., label) can represent the series of underlying steps of the recording that corresponded to an associated pattern. The representation of the modified recording can then be simplified by the use of the pattern's designator in place of the underlying steps of the recording. In one implementation, the designator (or object associated therewith) representing the pattern within the modified recording can be displayed and be selectable, and upon selection, cause the series of underlying steps of the corresponding pattern to be displayed.

Figure 3:
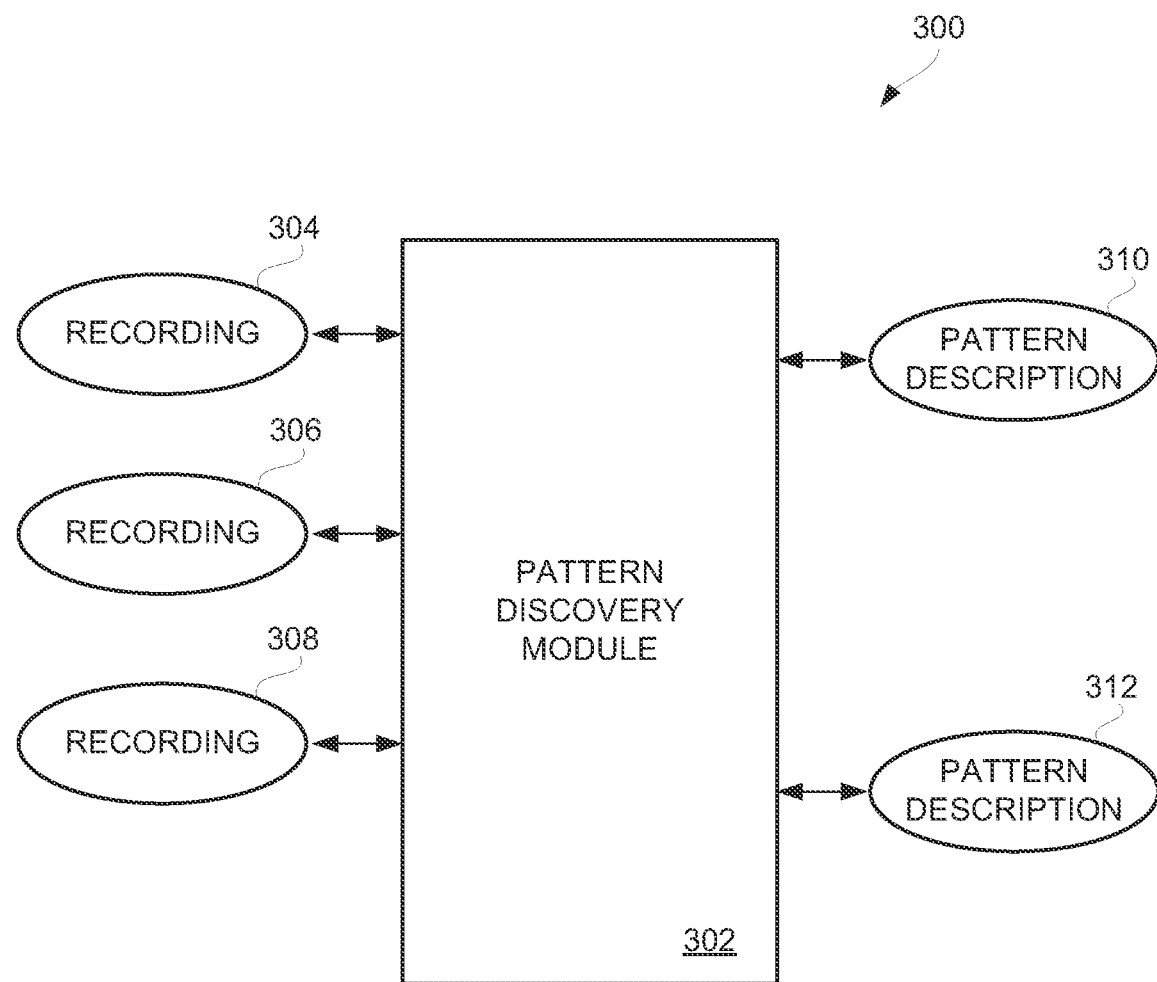
FIG. 3 is a block diagram of a pattern discovery subsystem according to one embodiment.

FIG. 3 is a block diagram of a pattern discovery sub-system 300 according to one embodiment. The pattern discovery sub-system 300 is, for example, suitable for use as the pattern discovery sub-system 206 illustrated in FIG. 2. The pattern discovery sub-system 300 includes a pattern discovery module 302. The pattern discovery module 302 can receive a plurality of recordings 304, 306 and 308. These various recordings can be examined by the pattern discovery module 302 to identify one or more repeating sequence of user-initiated steps that can be consolidated into a pattern. By examining a large number of recordings, the repeating sequences of user-initiated steps that are more common, or better candidates for patterns, can be identified. Through use of machine learning, pattern detection can be learned from examination of a large number of recordings. In addition, variations in the underlying steps across different recordings can be merged such that a pattern is able to represent recordings even in the face of minor variations in the underlying steps of the recordings. For each of the patterns that the pattern discovery module 302 can detect, a pattern description can be formed. As an example, the pattern discovery module 302 can produce pattern description 310 and pattern description 312. The pattern description 310, 312 can be described by a descriptive notation that can have a structured format that is computer readable, such as the JSON format.

Figure 4:
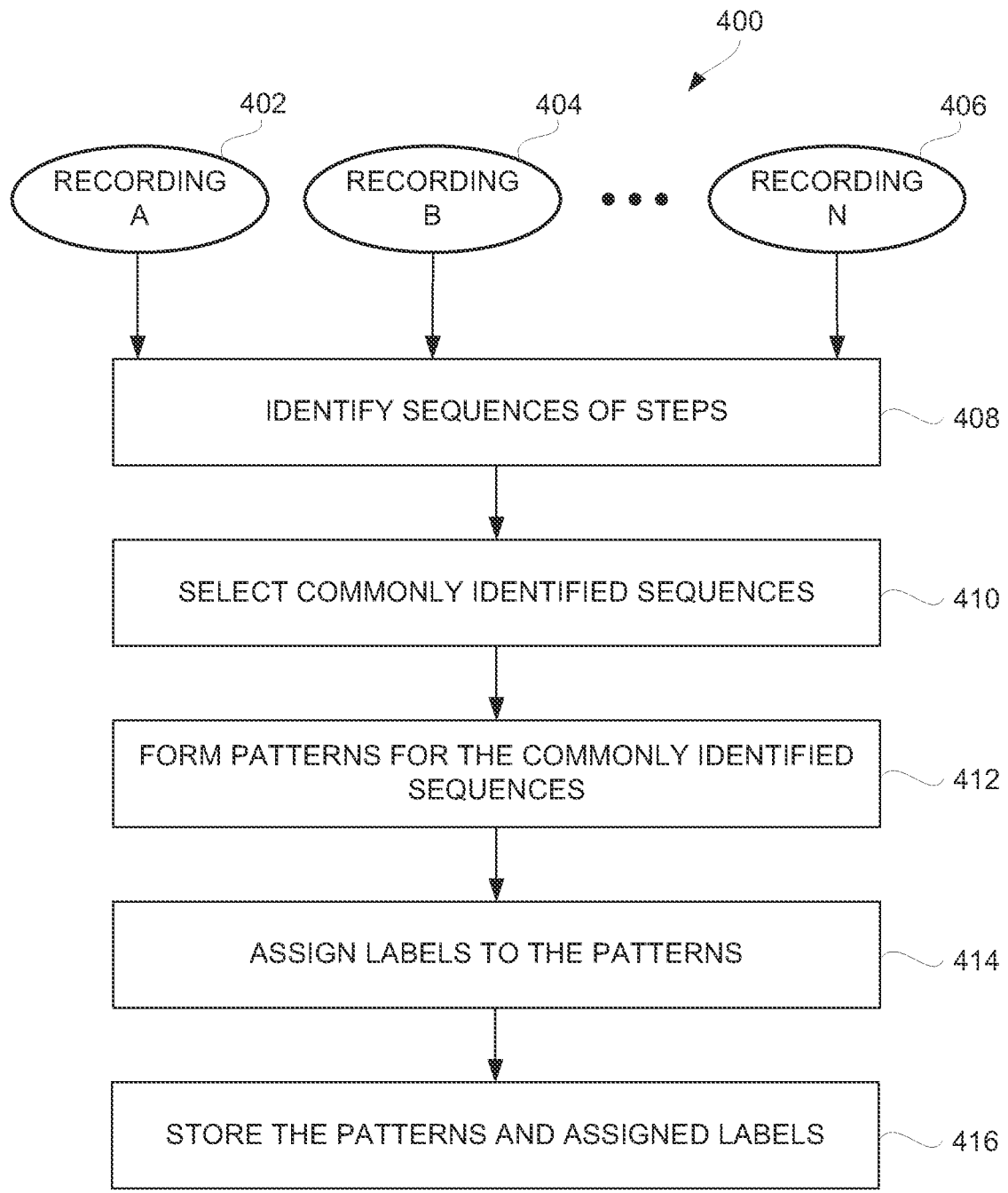
FIG. 4 is a flow diagram of a pattern discovery process according to one embodiment.

FIG. 4 is a flow diagram of a pattern discovery process 400 according to one embodiment. The pattern discovery process 400 is, for example, performed by the pattern discovery sub-system 206 illustrated in FIG. 2 or the pattern discovery module 302 illustrated in FIG. 3.

The pattern discovery process 400 can receive a series of recordings as inputs. As illustrated in FIG. 4, the pattern discovery process 400 receives series recordings, including recording A 402, recording B 404, . . . recording N 406, as examples. These various recordings can each be processed to identify 408 sequences of steps within the respective recordings. In one implementation, the processing associated with the identifying 408 sequences of steps includes placing the plurality of steps of each recording into a data structure. For example, one particularly useful data structure is a tree data structure (e.g., generalized suffix tree). The tree data structure allows the steps of a given recording to be organized such that sequences can be efficiently identified.

Next, the pattern discovery process 400 can select 410 repetitive (i.e., commonly identified) sequences. In other words, those of the sequences that have been found within various ones of the recordings can be selected 410. In one implementation, those of the sequences that commonly appear in the recordings are the sequences that are selected 410.

Note, however, the selection of those sequences that are selected to be the commonly identified sequences can be weighted, ranked, or prioritized to facilitate selection of the identified sequences that are the most useful. As one example, the selected sequences to be considered can be limited to those that have a minimum sequence length (e.g., a minimum number of steps in the sequence). Additionally, longer sequences can be preferred over shorter sequences. Also, those sequences that appear more often can be preferred. For example, a sequence might be required to have appeared a minimum number of times within a significant number of different recordings in order to be considered. This, for example, provides an indication of whether a sequence is common or not. Further still, those sequences that occur earlier in a recording can be preferred over overlapping sequences that appear later in the recording. Each identified sequence can have a weight value assigned, such that a sequence can be chosen from the available sequences based at least in part on the respective assigned weight values.

After the commonly identified sequences have been selected 410, patterns can be formed 412 for the commonly identified sequences. Here, a pattern can be formed 412 for each of the commonly identified sequences. Same or similar sequences can be correlated to the same pattern. The pattern can be documented by a pattern definition which is descriptive of the pattern. Subsequently, using the pattern definition, it can be determined, by a computing device, whether or not a given recording includes a sequence of steps that matches the pattern definition. Examples of pattern definitions are provided below concerning exemplary recordings discussed with regards to FIGS. 7A-8C.

Next, for each of the patterns that have been formed, labels can be assigned 414. The labels can be descriptive words or phrases that are representative of the actions or sub-task performed by the sequence of steps of the associated pattern. The label for a pattern can be provided in the pattern definition for that pattern. The labels can be assigned by a computer in a computer automated manner, by user input, or by some combination thereof. Thereafter, the patterns and assigned labels can be stored 416 for subsequent use.

Here, the pattern discovery process 400 can examine a significant number of recordings to identify common sequences of steps that are good candidates to form into patterns. The patterns that are formed are then defined, labeled and stored for subsequent use. The pattern discovery process 400 operates to determine various patterns that can be made available for potential use to organize subsequent recordings if the subsequent recordings include a sequence of steps that match one of the previously determined patterns.

Figure 5:
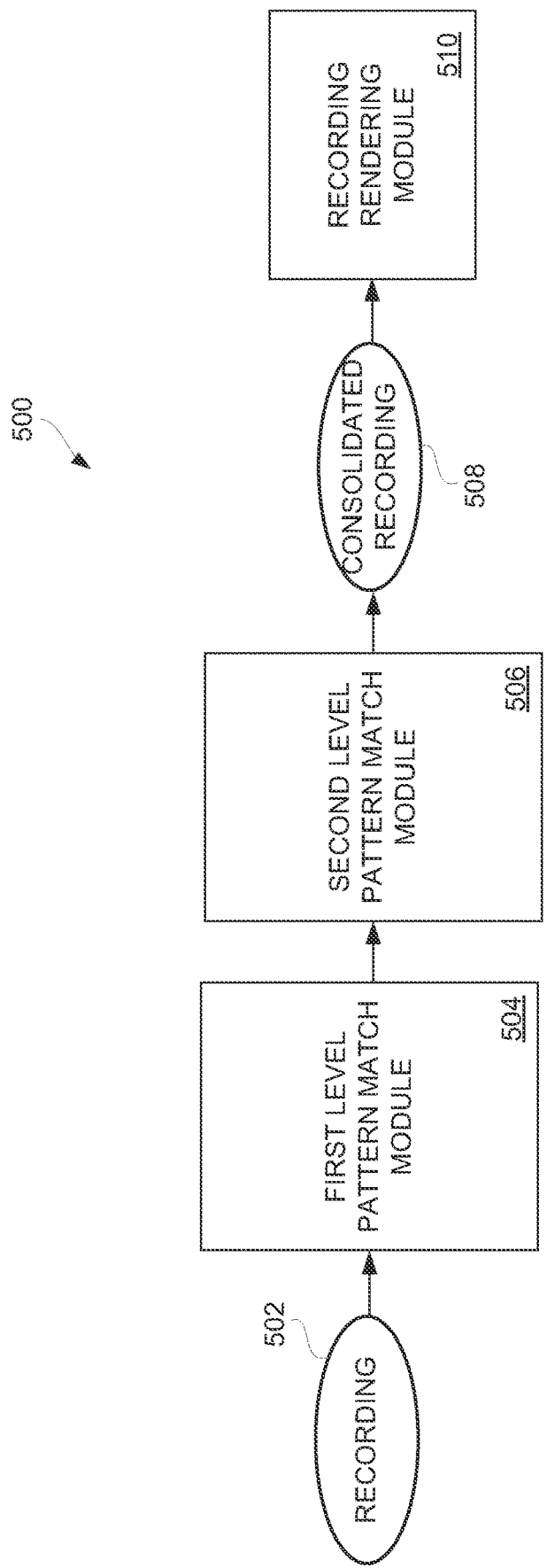
FIG. 5 is a block diagram of a recording modification subsystem according to one embodiment.

FIG. 5 is a block diagram of a recording modification sub-system 500 according to one embodiment. The recording modification sub-system 500 is, for example, suitable for use as the recording modification sub-system 212 illustrated in FIG. 2. The recording modification sub-system 500 provides multi-level pattern matching to convert a recording to a consolidated recording. In this embodiment, the consolidated recording is a consolidated recording that provides a multi-level (e.g., hierarchical) representation that offers improved understanding of the one or more tasks or sub-tasks being performed by the recording. In this embodiment, a first level of pattern matching is based on step level patterns, and a second level of pattern matching is based on group level patterns.

The recording modification sub-system 500 can receive a recording 502. The recording 502 can then be provided to a first level pattern match module 504. The first level pattern match module 504 reviews the sequences identified within the recording 502 and compares the sequences with previously determined patterns (i.e., predetermined patterns). In doing so, those of the sequences within the recording 502 that match at least one of the predetermined patterns are identified as first level patterns. Each of the previously determined patterns can be described by a pattern definition. These pattern definitions can be used to identify those sequences of steps within a recording that are deemed to match the determined pattern.

Next, after the first level patterns within the recording 502 have been identified at the first level pattern match module 504, a subsequent higher-level pattern match can be attempted at a second level pattern match module 506. In this regard, the second level pattern match module 506 can evaluate the recording 502 along with any first level patterns identified at the first level pattern match module 504, to identify one or more second level patterns. After the one or more second level patterns have been identified in the recording 502, the recording 502 can be referred to as a consolidated recording 508. The consolidated recording 508 is the result of the second level pattern match module 506. The consolidated recording 508 is a recording that is hierarchically organized to denote one or more patterns, which are first level patterns or second level patterns. The consolidated recording 508 can also be stored for subsequent use.

After one or more second level patterns have been identified at the second level pattern match module 506, the resulting multi-level matched recording, which is the consolidated recording 508, can be provided to a recording rendering module 510. The recording rendering module 510 can present the consolidated recording 508 to reflect one or more first level patterns and/or one or more second level patterns within the recording 502. For example, the recording rendering module 510 can render (e.g., display) the consolidated recording 508 on a display device. In one embodiment, the recording rendering module 508 can present the modified recording in a hierarchical representation that offers a significant ease of understanding of the one or more tasks or sub-tasks being performed by the recording 502. The recording rendering module 510 can render a consolidated depiction of the recording 502 where first level and/or second level patterns are represented by a pattern designator (e.g., label) when initially presented. However, on selection of the pattern designator (or associated object), the steps (and/or lower-level patterns) within that pattern can be displayed.

Figure 6:
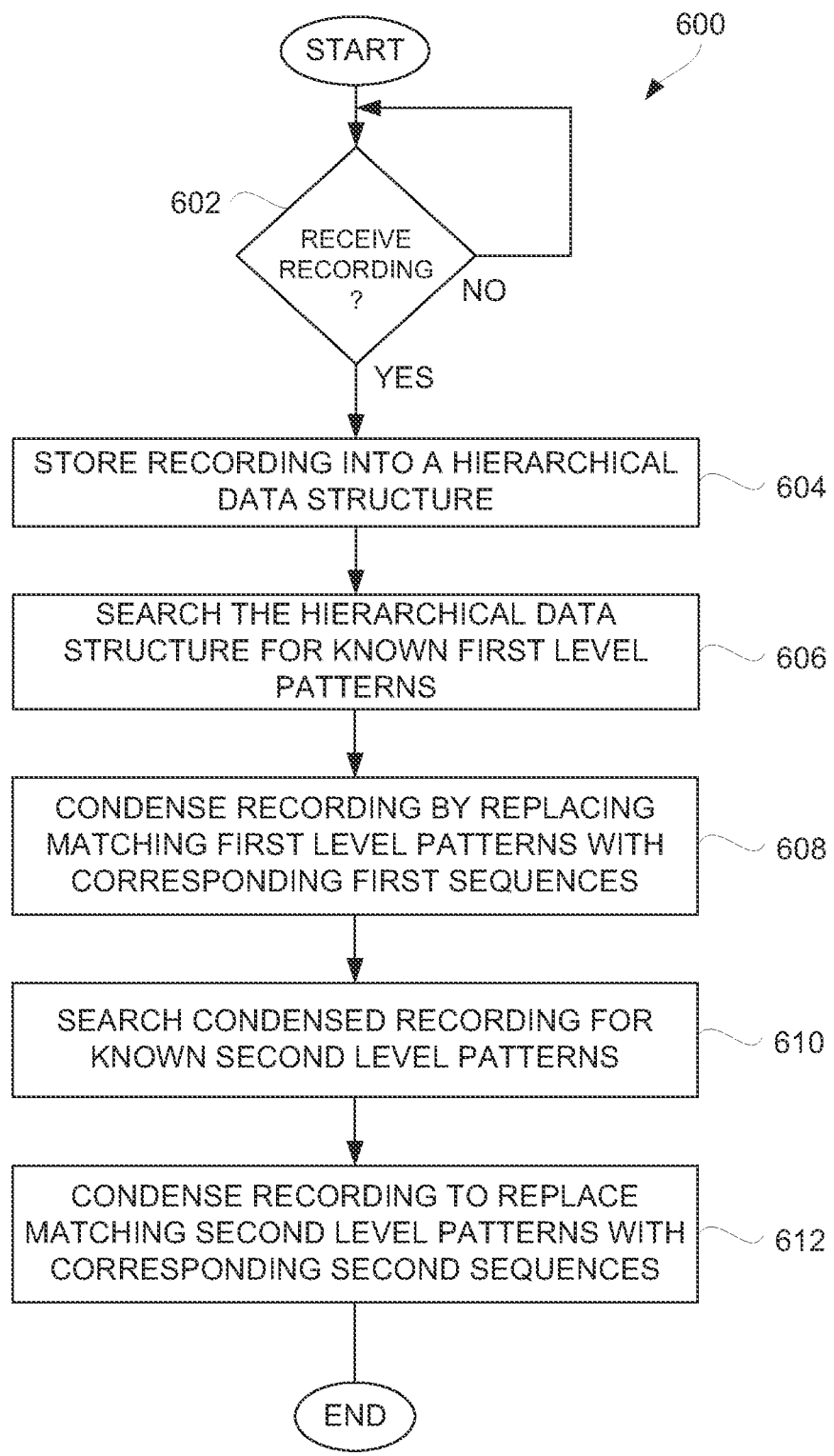
FIG. 6 is a flow diagram of a recording consolidation process according to one embodiment.

FIG. 6 is a flow diagram of a recording consolidation process 600 according to one embodiment. The recording consolidation process 600 can, for example, be performed by a recording modification sub-system, such as the recording modification sub-system 212 illustrated in FIG. 2 or the recording modification sub-system 500 illustrated in FIG. 5.

The recording consolidation process 600 can begin with a decision 602 that determines whether a recording that is to be processed has been received. When the decision 602 determines that a recording has not been received, the recording consolidation process 600 can await receipt of a recording to be processed.

On the other hand, once the decision 602 determines that a recording to be processed has been received, the recording consolidation process 600 can continue. Here, the recording received is provided after a RPA system has processed a plurality of recordings, which can be associated with the same task or process, to identify one or more first level patterns and/or one or more second level patterns. As an example, the first level patterns can be step level patterns, and the second level patterns can be group level patterns. When the processing continues, the recording can be stored 604 into a hierarchical data structure. The hierarchical data structure is a data structure where the steps of the recording are organized in a hierarchical manner so that sequences of steps are able to be efficiently identified. One example of a suitable data structure is a tree data structure (e.g., generalized suffix tree).

Next, the hierarchical data structure can be searched 606 for known first level patterns. Here, it should be understood that a pattern discovery sub-system, such as the pattern discovery sub-system 300 illustrated in FIG. 3, has previously operated to identify first level patterns within a plurality of similar recordings. The searching 606 of the hierarchical data structure for known first level patterns evaluates whether the sequence of steps within the recording, as organized by the hierarchical data structure, match any of the known first level patterns. Then, the recording can be condensed 608 by replacing any matching first level patterns for their corresponding sequence of steps within the recording.

After the matching first level patterns have been identified and used to consolidate the recording, the recording consolidation process 600 can also support a second level of consolidation, which in one embodiment can be referred to as a group level. In this regard, the condensed recording can be searched 610 for known second level patterns. Here, again, it is understood that the pattern discovery subsystem, such as a pattern discovery sub-system 300 illustrated in FIG. 3, previously operated to identify second level patterns within a plurality of similar recordings. These identified group level patterns are considered to be known group level patterns when processing a subsequently received recording.

The known second level patterns can be described by pattern designators (e.g., pattern definitions), which can be computer readable. For example, the pattern descriptions for the second level patterns can be provided in a JSON format. Next, the recording can be further condensed 612 to replace any matching second level patterns for their corresponding group sequences. By doing so, the recording is further consolidated to provide the second level hierarchy. Following the consolidation 612 with respect to the second level patterns, the recording consolidation process 600 can end.

FIGS. 7A-8B depict processing diagrams illustrating exemplary processing of recordings concerning transmission of an email. These processing diagrams are exemplary and not intended to be limiting, as processing to modify recordings can proceed differently by other criteria or rules in other embodiments.

Figure 7A:
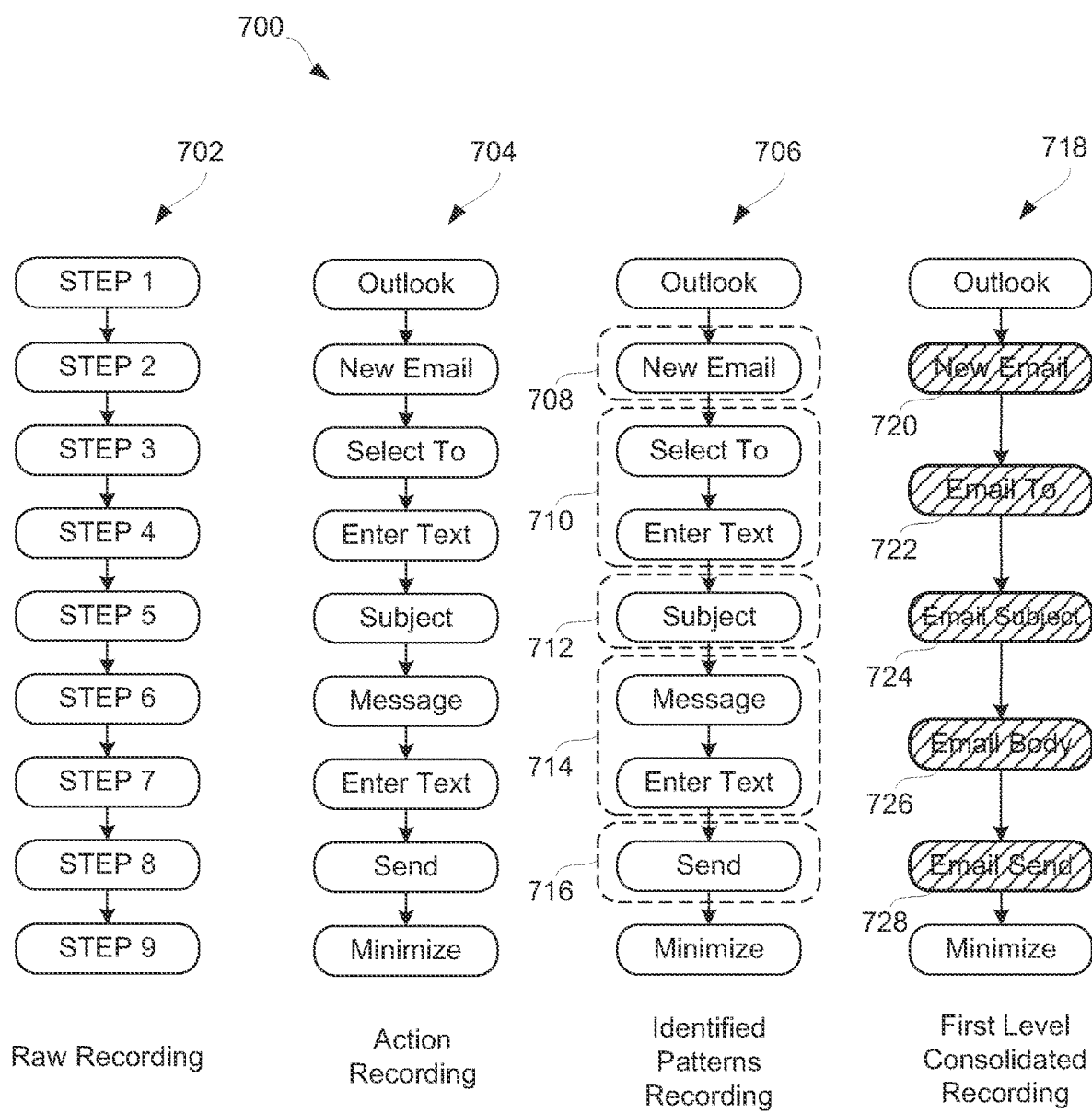
FIG. 7A is a diagram of an exemplary modification process according to one embodiment.

FIG. 7A is a diagram of an exemplary modification process 700 according to one embodiment. The exemplary modification process 700 provides a simplified example of processing a raw recording into a consolidated recording. In this embodiment, the raw recording pertains to steps associated with a user interacting with Microsoft's Outlook email application to send an email.

The exemplary modification process 700 receives a raw recording 702 that is to be processed by the exemplary modification processing 700. The raw recording 702 includes a sequence of user-initiated interactions that a user previously induced with regard to one or more application programs. These user-initiated interactions are denoted as steps. The user-initiated interactions, or steps, are typically click-level actions (e.g., individual low-level events) with respect to graphical user interfaces of one or more application programs.

As illustrated in FIG. 7A, the raw recording 702, in this example, includes a sequence of steps, from Step 1 through Step 9. Each of the steps within the raw recording 702 has associated attributes that are descriptive of the corresponding step. In one implementation, a given step can have a plurality of attributes. These attributes, or a set thereof, can serve to identify a given step. Two steps from different recordings that have a matching set of attributes can be deemed the same (or matching) step.

The attributes being used for step identification and matching can vary with implementation. Some exemplary attributes include one or more of: application name (or application), action name (or action), action value, user interface ("UI") criteria name (or criteria name), class name, UI element (or element), and/or input data (or input). As examples, application name can pertain to explorer, outlook, chrome, java, and other similar names; action name can pertain to LEFTCLICK, SETTEXT, and other similar names; action value can pertain to clientAction, buttonAction, textboxAction, and other similar values; UI criteria name can pertain to Recorder Warning, New Tab, New Email, Subject, Message, Send, Close, and other similar criteria names; class name can pertain to Chrome_WidgetWin_1, GlassWndClass-GlassWindowClass-3, and other similar class names; and UI element can pertain to button, textbox, client, and other similar UI elements. Input data is data a user inputs via the UI. More specifically, as to the raw recording 702, the particular attributes being used for identification and matching, as well as their values, are noted in the following table:

| Step | Application | Action | Criteria_Name | Element | Input |
|---|---|---|---|---|---|
| 1 | Explorer | LEFTCLICK | Outlook - 1 running window | BUTTON | |
| 2 | Outlook | LEFTCLICK | New Email | BUTTON | |
| 3 | Outlook | SETTEXT | To | TEXTBOX | id@mail.com |
| 4 | Outlook | SETTEXT | | TEXTBOX | |
| 5 | Outlook | SETTEXT | Subject | TEXTBOX | Test Message |
| 6 | Outlook | LEFTCLICK | Message | CLIENT | |
| 7 | Outlook | SETTEXT | | CLIENT | Sample test message - Message (HTML) |
| 8 | Outlook | LEFTCLICK | Send | BUTTON | |
| 9 | Outlook | LEFTCLICK | Minimize | BUTTON | |

The exemplary modification process 700 can operate on the raw recording 702 to produce an action recording 704. The exemplary modification process 700 can identify the action associated with each step within the raw recording 702, and then produce the action recording 704 using the identified actions for each of the steps within the raw recording 702. For example, based on the attributes of the raw recording 702, Step 1 of the raw recording 702 has an action pertaining to "Explorer" and serves to open a window pertaining to an email program "Outlook". Both Explorer and Outlook are software programs produced by Microsoft Corporation. Hence, the first step in the action recording 704 can be represented by an action "Outlook". In performing the exemplary modification processing 700, the action recording 704 need not be generated. However, for purposes of illustration, the action recording 704 is useful to understand that the steps within the raw recording 702 are associated with particular actions being carried out. Similarly, for Steps 2 through 9 of the raw recording 702, the actions are respectively "New Email", "Select To", "Enter Text", "Subject", "Message", "Enter Text", "Send", and "Minimize". These actions are all associated with the application program "Outlook". The various actions being used in the action recording 704 can, for example, be derived from the "Criteria_Name" and the "Input" fields from the table presented above.

The exemplary modification process 700 can discover identified patterns within the raw recording 702. In this embodiment, the exemplary modification process 700 evaluates the action recording 704 (or the raw recording 702) and identifies one or more patterns present. The patterns are typically a series of steps of the raw recording 702 that have been previously found to frequently repeat in various recordings associated with performing the same or similar processing task. In this embodiment, the raw recording 702 pertains to use of an email program, and thus the action recording 704 indicates various actions involved with interacting with an email program (e.g., Outlook). In the example as shown in FIG. 7A, the identified patterns within an identified patterns recording 706 are represented by dashed lines. In this example, a first pattern 708 includes a single step pertaining to a "New Email" action. A second pattern 710 pertains to a sequence of steps, with a first step pertaining to "Select To" followed by a second step pertaining to "Enter Text". A third pattern 712 pertains to a single step pertaining to "Subject". A fourth pattern 714 pertains to the sequence of steps, with a first step pertaining to "Message" followed by a second step pertaining to "Enter Text". A fifth pattern 716 pertains to a single step pertaining to "Send".

The exemplary modification process 700 also depicts a consolidated recording 718. The consolidated recording 718 represents the raw recording 702 after a first level modification processing has been performed. The consolidated recording 718 is a first level consolidated recording. In this exemplary modification process 700, the first level modification processing is performed at the step level; hence, the consolidated recording 718 can also be referred to as a step level consolidated recording. In this regard, the consolidated recording 718 includes a designator (e.g., label) for each of the identified patterns. The representation of the consolidated recording 718 utilizes the pattern's designator in place of the one or more steps of the raw recording 702 that correspond to the corresponding identified pattern. As illustrated in FIG. 7A, the consolidated recording 718 includes a pattern designator 720 denoting "New Email" in place of the one or more steps corresponding to the first pattern 708. Similarly, the consolidated recording 718 includes a pattern designator 722 denoting "Email To" in place of the one or more steps corresponding to the second pattern 710. The consolidated recording 718 also includes a pattern designator 724 denoting "Email Subject" in place of the one or more steps corresponding to the third pattern 712. Still further, the consolidated recording 714 includes a pattern designator 726 denoting "Email Body" in place of the one or more steps corresponding to the fourth pattern 714. Finally, the consolidated recording 714 includes a pattern designator 728 denoting "Email Send" in place of the one or more steps corresponding to the fifth pattern 716.

Consequently, the consolidated recording 718 can be represented and/or visualized in a much more understandable fashion. This allows a user to understand the raw recording 702 in a simpler fashion and further allows for a more robust and efficient RPA processing by an RPA system. For example, using the consolidated recording 718, an RPA system can generate SAPs to carry out one or more patterns of steps recognized within recordings.

Figure 7B:
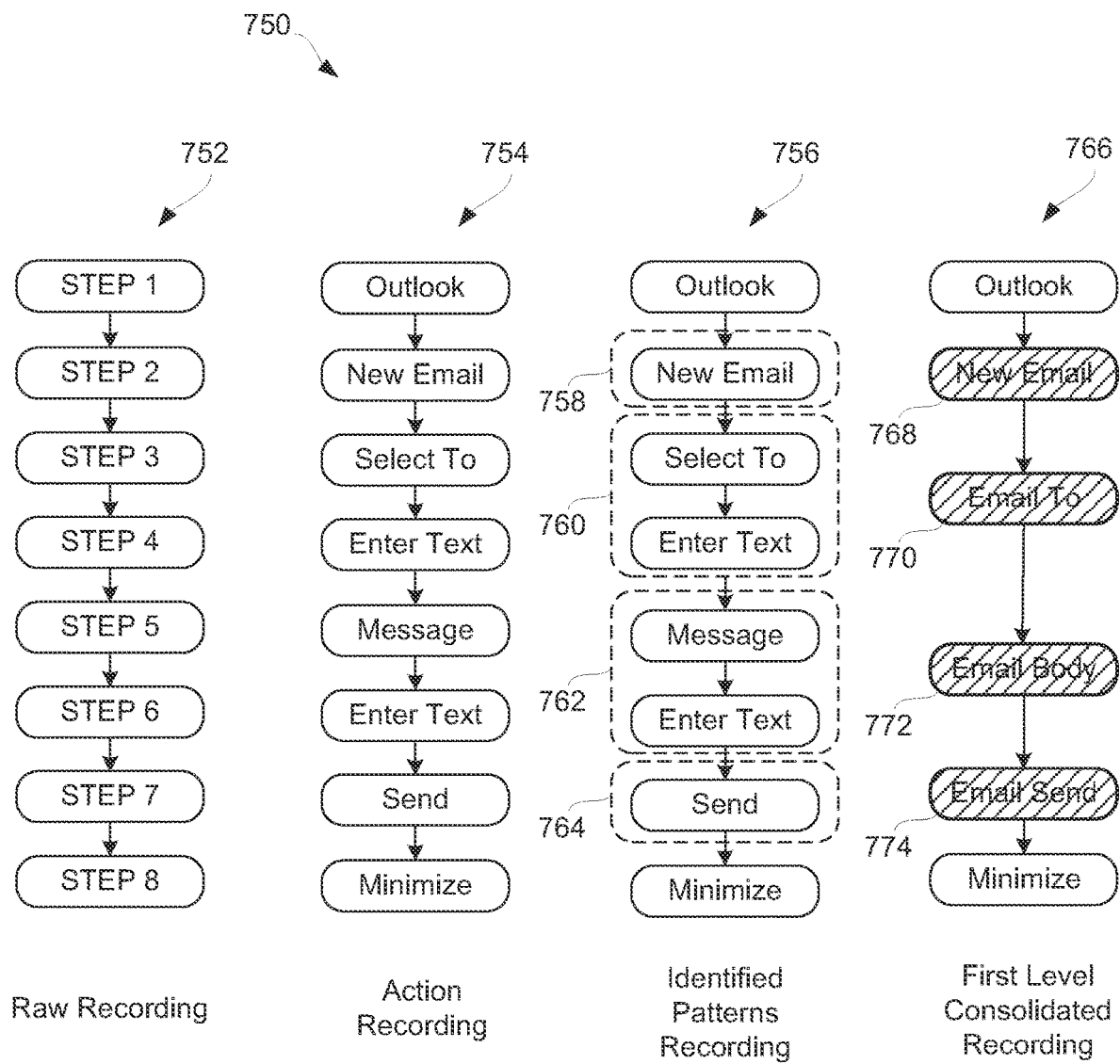
FIG. 7B is a diagram of an exemplary modification process according to another embodiment.

FIG. 7B is a diagram of an exemplary modification process 750 according to another embodiment. The exemplary modification process 750 provides a simplified example of processing a raw recording into a consolidated recording. In this embodiment, the raw recording pertains to steps associated with a user interacting with Microsoft's Outlook email program to send an email.

The exemplary modification process 750 receives a raw recording 752 that is to be processed by the exemplary modification process 750. The raw recording 752 includes a sequence of user-initiated interactions that a user previously induced with regard to one or more application programs. These user-initiated interactions are denoted as steps. The user-initiated interactions, or steps, are typically click-level actions (e.g., individual low-level events) with respect to graphical user interfaces of one or more application programs.

As illustrated in FIG. 7B, the raw recording 752, in this example, includes a sequence of steps, from Step 1 through Step 8. Each of the steps within the raw recording 752 has associated attributes that are descriptive of the corresponding step. In one implementation, a given step can have a plurality of attributes. These attributes, or a set thereof, can serve to identify a given step. Two steps from different recordings that have a matching set of attributes can be deemed the same (or matching) step.

The attributes being used for step identification and matching can vary with implementation. Some exemplary attributes include one or more of: application name (or application), action name (or action), action value, user interface ("UI") criteria name (or criteria name), class name, UI element (or element), and/or input data (or input). As examples, application name can pertain to explorer, outlook, chrome, java, and other similar names; action name can pertain to LEFTCLICK, SETTEXT, and other similar names; action value can pertain to clientAction, buttonAction, textboxAction, and other similar values; UI criteria name can pertain to Recorder Warning, New Tab, New Email, Subject, Message, Send, Close, and other similar criteria names; class name can pertain to Chrome_WidgetWin_1, GlassWndClass-GlassWindowClass-3, and other similar class names; UI element can pertain to button, textbox, client, and other similar UI elements, Input data is data a user inputs via the UI. More specifically, as to the raw recording 752, the particular attributes being used for identification and matching, as well as their values, are noted in the following table:

| Step | Application | Action | Criteria_Name | Element | Input |
|---|---|---|---|---|---|
| 1 | Explorer | LEFTCLICK | Outlook - 1 running window | BUTTON | |
| 2 | Outlook | LEFTCLICK | New Email | BUTTON | |
| 3 | Outlook | SETTEXT | To | TEXTBOX | |
| 4 | Outlook | SETTEXT | | TEXTBOX | id@mail.com |
| 5 | Outlook | LEFTCLICK | Message | CLIENT | |
| 6 | Outlook | SETTEXT | | CLIENT | Sample test message - Message (HTML) |
| 7 | Outlook | LEFTCLICK | Send | BUTTON | |
| 8 | Outlook | LEFTCLICK | Minimize | BUTTON | |

The exemplary modification process 750 can operate on the raw recording 752 to produce an action recording 754. The exemplary modification process 750 can identify the action associated with each step within the raw recording 752, and then produce the action recording 754 using the identified actions for each of the steps within the raw recording 752. For example, based on the attributes of the raw recording 752, Step 1 of the raw recording 752 has an action pertaining to "Explorer" and serves to open a window pertaining to an email program "Outlook". Hence, the first step in the action recording 754 can be represented by an action "Outlook". In performing the exemplary modification process 750, the action recording 754 need not be generated. However, for purposes of illustration, the action recording 754 is useful to understand how the steps within the raw recording 752 are associated with particular actions being carried out. Similarly, for Steps 2 through 8 of the raw recording 752, the actions are respectively "New Email", "Select To", "Enter Text", "Message", "Enter Text", "Send", and "Minimize". These actions are all associated with the application program "Outlook". The various actions being used in the action recording 754 can, for example, be derived from the "Criteria_Name" and the "Input" fields from the table presented above.

The exemplary modification process 750 can discover identified patterns within the raw recording 752. In this embodiment, the exemplary modification process 750 evaluates the action recording 754 (or the raw recording 752) and identifies one or more patterns that are present. The patterns are typically a series of steps of the raw recording 752 that have been previously found to repeat frequently in various recordings associated with performing a same or similar processing task. In this embodiment, the raw recording 752 pertains to use of an email program, and thus the action recording 754 indicates various actions involved with interacting with an email program (e.g., Outlook). In the example shown in FIG. 7B, the identified patterns within an identified patterns recording 756 are represented by dashed lines. In this example, a first pattern 758 includes a single step pertaining to a "New Email" action. A second pattern 760 pertains to a sequence of steps, with a first step pertaining to "Select To" followed by a second step pertaining to "Enter Text". A third pattern 762 pertains to a sequence of steps, with a first step pertaining to "Subject" followed by a second step pertaining to "Enter Text" action. A fourth pattern 764 pertains to a single step pertaining to "Send".

The exemplary modification process 750 also depicts a consolidated recording 766. The consolidated recording 766 represents the raw recording 752 after a first level modification processing has been performed. The consolidated recording 766 is a first level consolidated recording. In this exemplary modification process 750, the first level modification processing is performed at the step level; hence, the consolidated recording 766 can also be referred to as a step level consolidated recording. In this regard, the consolidated recording 766 includes a designator (e.g., label) for each of the identified patterns. The representation of the consolidated recording 766 utilizes the pattern's designator in place of the one or more steps of the raw recording 752 that correspond to the corresponding identified pattern. As illustrated in FIG. 7B, the consolidated recording 766 includes a pattern designator 768 denoting "New Email" in place of the one or more steps corresponding to the first pattern 750. Similarly, the consolidated recording 766 includes a pattern designator 770 denoting "Email To" in place of the one or more steps corresponding to the second pattern 760. The consolidated recording 766 also includes a pattern designator 772 denoting "Email Body" in place of the one or more steps corresponding to the third pattern 762. Finally, the consolidated recording 766 includes a pattern designator 764 denoting "Email Send" in place of the one or more steps corresponding to the fourth pattern 764.

Consequently, the consolidated recording 766 can be represented and/or visualized in a much more understandable fashion this allows a user to understand the raw recording 752 in a simpler fashion and further allows for a more robust and efficient RPA processing by an RPA system. For example, using the consolidated recording 766, an RPA system can generate SAPs to carry out one or more patterns of steps recognized within the recordings.

In one embodiment, the patterns that have been previously identified that are relevant for use with the exemplary modification process 700 and 750 for identifying first level patterns within the raw recordings 702 and 752, can be defined by pattern descriptions (e.g., pattern definitions). In this embodiment, the raw recordings 702 and 752 are simplified examples and generally concern making and sending an email message. As used in the examples, certain attributes of steps of a recording can be used in identifying a pattern match. By matching patterns, both the raw recordings 702 and 752 are able to be consolidated into first level consolidated recordings while retaining its underlying native steps.

In one implementation, the exemplary first level pattern descriptions (e.g., pattern definitions) can include the following six (6) defined patterns:

```
[
  {
     "patternId": 1,
     "patternLabel": "Email Open",
     "patternCode": "pattern.email.open",
     "patternWeight": 2,
     "attributes": [
        {
           "application": "outlook",
           "title": "Inbox - id@email.com - Outlook",
           "action": "LEFTCLICK",
           "ui_criteria_name": "New Email",
           "ui_control_type": "BUTTON",
           "ui_window_name": "Inbox - id@email.com - Outlook",
           "input_value": ""
        }
     ],
     "selectedAttributes": [
        "application",
        "ui_control_type",
        "action",
        "ui_criteria_name"
     ]
  },
  {
     "patternId": 2,
     "patternLabel": "Email To",
     "patternCode": "pattern.email.add.to",
     "patternWeight": 2,
     "attributes": [
        {
           "application": "outlook",
           "title": "Untitled - Message (HTML) ",
           "action": "SETTEXT",
           "ui_criteria_name": "To",
           "ui_control_type": "TEXTBOX",
           "ui_window_name": "Untitled - Message (HTML) ",
           "input_value": ""
        },
        {
           "application": "outlook",
           "title": "Untitled - Message (HTML) ",
           "action": "SETTEXT",
           "ui_criteria_name": "id@mail.com",
           "ui_control_type": "TEXTBOX",
           "ui_window_name": "Untitled - Message (HTML) ",
           "input_value": ""
        }
     ],
     "selectedAttributes": [
```

```
            "application",
            "ui_control_type",
            "action",
            "ui_criteria_name"
        ]
    },
    {
        "patternId": 3,
        "patternLabel": "Email Cc",
        "patternCode": "pattern.email.add.cc",
        "patternWeight": 2,
        "attributes": [
            {
                "application": "outlook",
                "title": "Untitled - Message (HTML) ",
                "action": "SETTEXT",
                "ui_criteria_name": "Cc",
                "ui_control_type": "TEXTBOX",
                "ui_window_name": "Untitled - Message (HTML) ",
                "input_value": ""
            },
            {
                "application": "outlook",
                "title": "Untitled - Message (HTML) ",
                "action": "SETTEXT",
                "ui_criteria_name": "id@mail.com",
                "ui_control_type": "TEXTBOX",
                "ui_window_name": "Untitled - Message (HTML) ",
                "input_value": ""
            }
        ],
        "selectedAttributes": [
            "application",
            "ui_control_type",
            "action",
            "ui_criteria_name"
        ]
    },
    {
        "patternId": 4,
        "patternLabel": "Email Subject",
        "patternCode": "pattern.email.add.subject",
        "patternWeight": 2,
        "attributes": [
            {
                "application": "outlook",
                "title": "Inbox - id@email.com - Outlook",
                "action": "LEFTCLICK",
                "ui_criteria_name": "Subject",
                "ui_control_type": "TEXTBOX",
                "ui_window_name": "Inbox - id@email.com - Outlook",
                "input_value": ""
            }
        ],
        "selectedAttributes": [
            "application",
            "ui_control_type",
            "action",
            "ui_criteria_name"
        ]
    },
    {
        "patternId": 5,
        "patternLabel": "Email Body",
        "patternCode": "pattern.email.add.body",
        "patternWeight": 2,
        "attributes": [
            {
                "application": "outlook",
                "title": "Inbox - id@email.com - Outlook",
                "action": "LEFTCLICK",
                "ui_criteria_name": "Message",
                "ui_control_type": "CLIENT",
                "ui_window_name": "Inbox - id@email.com - Outlook",
                "input_value": ""
            },
            {
                "application": "outlook",
                "title": "Untitled - Message (HTML) ",
                "action": "SETTEXT",
                "ui_criteria_name": "id@mail.com",
                "ui_control_type": "CLIENT",
                "ui_window_name": "Untitled - Message (HTML) ",
                "input_value": ""
            }
        ],
        "selectedAttributes": [
            "application",
            "ui_control_type",
            "action",
            "ui_criteria_name"
        ]
    },
    {
        "patternId": 6,
        "patternLabel": "Email Send",
        "patternCode": "pattern.email.send",
        "patternWeight": 2,
        "attributes": [
            {
                "application": "outlook",
                "title": "Inbox - id@email.com - Outlook",
                "action": "LEFTCLICK",
                "ui_criteria_name": "Send",
                "ui_control_type": "BUTTON",
                "ui_window_name": "Inbox - id@email.com - Outlook",
                "input_value": ""
            }
        ],
        "selectedAttributes": [
            "application",
            "ui_control_type",
            "action",
            "ui_criteria_name"
        ]
    }
]
```

A first pattern of the exemplary pattern descriptions is a pattern labeled as "Email Open", provided with a pattern weight of "2", a pattern code name "pattern.email.open", and a series of attributes that are descriptive of steps which might match the first pattern. The first pattern may identify the attributes of:

"application": "outlook",

"title": "Inbox—id@email.com—Outlook",

"action": "LEFTCLICK",

"ui_criteria_name": "New Email",

"ui_control_type": "BUTTON",

"ui_window_name": "Inbox—id@email.com—Outlook",

"input_value": " "

For purposes of the first pattern, the "matching" with the first pattern requires a match with each of those identified attributes that are denoted as selected attributes, which in this first pattern includes the attributes of: "application", "ui_control_type", "action", and "ui_criteria_name".

A second pattern of the exemplary pattern descriptions is a pattern labeled as "Email To", provided with a pattern weight of "2", a pattern code name "pattern.email.add.to", and a series of attributes that are descriptive of steps which might match the second pattern. This second pattern requires a series of two steps that match a set of attributes. For a step to match the first step in the second pattern, the second pattern identifies the attributes of:

"application": "outlook",

"title": "Untitled—Message (HTML)",

"action": "SETTEXT",

"ui_criteria_name": "To",

"ui_control_type": "TEXTBOX",
"ui_window_name": "Untitled—Message (HTML)",
"input_value": " "

For a step to match the second step in the second pattern, the second pattern identifies the attributes of:
"application": "outlook",
"title": "Untitled—Message (HTML)",
"action": "SETTEXT",
"ui_criteria_name": "id@mail.com",
"ui_control_type": "TEXTBOX",
"ui_window_name": "Untitled—Message (HTML)",
"input_value": " "

For purposes of the second pattern, the "matching" with the second pattern requires a match with two sequential steps, where those of the identified attributes that are denoted as selected attributes, which in the second pattern includes the attributes of: "application", "ui_control_type", "action", and "ui_criteria_name".

A third pattern of the exemplary pattern descriptions is a pattern labeled as "Email Cc", provided with a pattern weight of "2", a pattern code name "pattern.email.add.cc", and a series of attributes that are descriptive of steps which might match the third pattern. This third pattern requires a series of two steps that match a set of attributes. For a step to match the first step in the third pattern, the third pattern identifies the attributes of:
"application": "outlook",
"title": "Untitled—Message (HTML)",
"action": "SETTEXT",
"ui_criteria_name": "Cc",
"ui_control_type": "TEXTBOX",
"ui_window_name": "Untitled—Message (HTML)",
"input_value": " "

For a step to match the second step in the third pattern, the third pattern identifies the attributes of:
"application": "outlook",
"title": "Untitled—Message (HTML)",
"action": "SETTEXT",
"ui_criteria_name": "id@mail.com",
"ui_control_type": "TEXTBOX",
"ui_window_name": "Untitled—Message (HTML)",
"input_value": " "

For purposes of the third pattern, the "matching" with the third pattern requires a match with two sequential steps, where those of the identified attributes that are denoted as selected attributes, which in the third pattern include the attributes of: "application", "ui_control_type", "action", and "ui_criteria_name", are considered.

A fourth pattern of the exemplary pattern descriptions is a pattern labeled as "Email Subject", provided with a pattern weight of "2", a pattern code name "pattern.email.add.Subject", and a series of attributes that are descriptive of steps which might match the fourth pattern. Although the fourth pattern identifies the attributes of:
"application": "outlook",
"title": "Inbox—id@email.com—Outlook",
"action": "LEFTCLICK",
"ui_criteria_name": "Subject",
"ui_control_type": "TEXTBOX",
"ui_window_name": "Inbox—id@email.com—Outlook",
"input_value": " "

For purposes of the fourth pattern, the "matching" with the fourth pattern requires a match with each of those identified attributes that are denoted as selected attributes which, in this fourth pattern, includes the attributes of: "application", "ui_control_type", "action", and "ui_criteria_name".

A fifth pattern of the exemplary pattern descriptions is a pattern labeled as "Email Subject", provided with a pattern weight of "2", a pattern code name "pattern.email.add.subject", and a series of attributes that are descriptive of steps which might match the fifth pattern. This fifth pattern requires a series of two steps that match a set of attributes. For a step to match the first step in the fifth pattern, the fifth pattern identifies the attributes of:
"application": "outlook",
"title": "Inbox—id@email.com—Outlook",
"action": "LEFTCLICK",
"ui_criteria_name": "Message",
"ui_control_type": "CLIENT",
"ui_window_name": "Inbox—id@email.com—Outlook",
"input_value": " "

For a step to match the second step in the fifth pattern, the fifth pattern identifies the attributes of:
"application": "outlook",
"title": "Untitled—Message (HTML)",
"action": "SETTEXT",
"ui_criteria_name": "id@mail.com",
"ui_control_type": "CLIENT",
"ui_window_name": "Untitled—Message (HTML)",
"input_value": " "

For purposes of the fifth pattern, the "matching" with the fifth pattern requires a match with two sequential steps, where those of the identified attributes that are denoted as selected attributes, which in the fifth pattern includes the attributes of: "application", "ui_control_type", "action", and "ui_criteria_name".

A sixth pattern of the exemplary pattern descriptions is a pattern labeled as "Email Send", provided with a pattern weight of "2", a pattern code name "pattern.email.send", and a series of attributes that are descriptive of steps which might match the sixth pattern. Although the sixth pattern identifies the attributes of:
"application": "outlook",
"title": "Inbox—id@email.com—Outlook",
"action": "LEFTCLICK",
"ui_criteria_name": "Send",
"ui_control_type": "BUTTON",
"ui_window_name": "Inbox—id@email.com—Outlook",
"input_value": " "

For purposes of the sixth pattern, the "matching" with the sixth pattern requires a match with each of those identified attributes that are denoted as selected attributes, which in this sixth pattern includes the attributes of: "application", "ui_control_type", "action", and "ui_criteria_name".

Figure 8A:
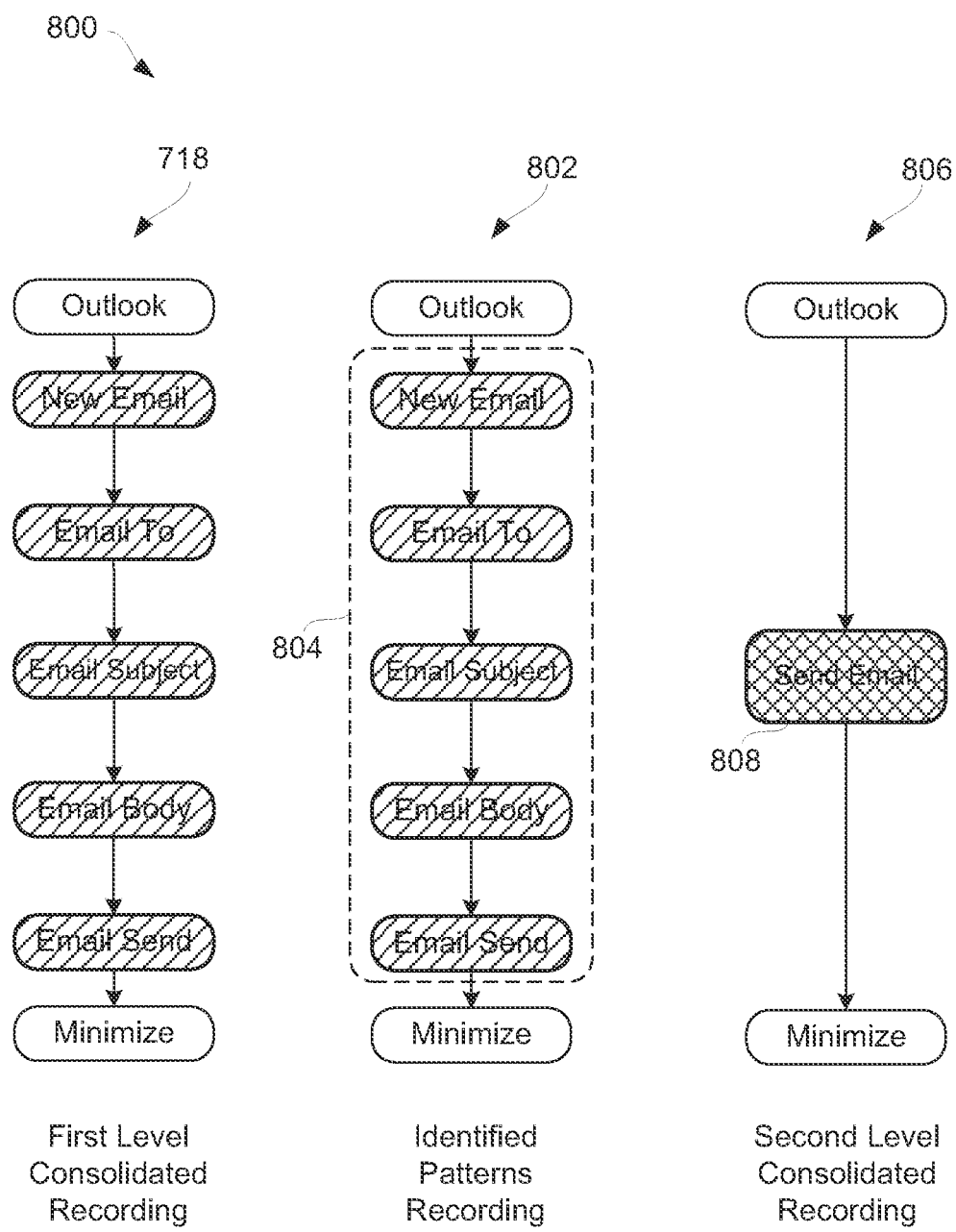
FIG. 8A is a diagram of an exemplary modification process according to one embodiment.

FIG. 8A is a diagram of an exemplary modification process 800 according to one embodiment. The exemplary modification process 800 provides a simplified example of processing the first level consolidated recording 718 produced by the exemplary modification process 700. The further processing by the exemplary modification process 800 performs additional pattern checking to produce a second level consolidated recording 806. The second level consolidated recording 806 is modified to denote one or more second level patterns but still retains the steps of the raw recording 702. Hence, patterns, if recognized (e.g., previously defined), can be identified or recognized and used to present the raw recording in a multi-level (e.g., hierarchical) organization, which, in this example, is associated with a user interacting with Microsoft's Outlook email application to make and send an email. In one embodiment, the second level modification processing 800 is performed at the group level; hence, the second level consolidated recording 806 can also be referred to as a group level consolidated recording.

The exemplary modification process 800 receives the first level consolidated recording 718 produced by the exemplary modification process 700 illustrated in FIG. 7A. The first level consolidated recording 718 illustrated in FIG. 7A can be processed by the exemplary modification process 800. At this point, the first level consolidated recording 718 can include steps from the raw recording 702 and/or identified first level patterns of steps that have been previously identified.

Next, the exemplary modification process 800 can discover identified patterns within the first level consolidated recording 718. In this embodiment, the exemplary modification process 800 can evaluate the first level consolidated recording 718 and identify one or more patterns present. The patterns being identified at this stage typically pertain to one or more first level patterns with or without one or more remaining ungrouped steps from the raw recording 702. These patterns are referred to second level patterns. In one implementation, the second level patterns can be group level patterns. Typically, these patterns have been previously found to frequently repeat in various recordings associated with performing the same or similar processing task.

In this embodiment, the first level consolidated recording 718 includes a series of previously identified patterns, and such patterns are first level patterns. The exemplary modification process 800 can produce an identified patterns recording 802. By examining the first level consolidated recording 718 for second level patterns, a second level pattern 804 can be discovered within the first level consolidated recording 718. As shown in FIG. 8A, the identified second level pattern 804 within the identified patterns recording 802 is represented by dashed lines. In this example, the identified second level pattern 804 being identified includes a series of five (5) first level patterns, which are denoted by the pattern designator "New Email", the pattern designator "Email To", the pattern designator "Email Subject", the pattern designator "Email Body", and the pattern designator "Email Send".

Finally, a second level consolidated recording 806 can be produced from the identified patterns recording 802. In this regard, the identified series of the first level patterns is deemed to match a previously determined pattern. As a result, the identified series of the first level patterns can be replaced in the second level consolidated recording 806 with a second level pattern designator 808 denoting "Send Email" as the sub-task being carried out by the various steps from the raw recording 702 that are grouped together via the first level patterns and the second level patterns.

Consequently, the second level consolidated recording 806 can be represented and/or visualized in a much more understandable fashion to allow a user to more easily understand the raw recording 702 and further allows for a more robust and efficient RPA processing by an RPA system. For example, using the second level consolidated recording 806, an RPA system can display the raw recording 702 as the second level consolidated recording 806. In doing so, in this example, the second level pattern designator 808 ("Send Email") is able to represent the series of five (5) first level patterns that was identified by the exemplary modification process 700 of FIG. 7A. Additionally, with the resulting hierarchical organization, the second level pattern designator 806 ("Send Email") in turn is also representing seven (7) steps from the raw recording 702 in much more consolidated and understandable manner. From the second level consolidated recording 806, the second level pattern designator 808 ("New Email") can be selected to drill-down to see the underlying steps and/or first level patterns being represented by the second level pattern designator 808 ("New Email"). The RPA system might also generate SAPs to carry out steps corresponding to one or more second level patterns recognized within recordings.

In one implementation, an exemplary second level pattern description (e.g., pattern definition) can define a grouping or arrangement of first level patterns. Since an exemplary second level pattern description can pertain to a grouping or arrangement of first level patterns, an exemplary second level pattern description can also be referred to as a group level pattern. An exemplary second level pattern description for a process or task to send an email is as follows:

```
[
    {
        "id": 0,
        "label": "Send Email",
        "code": "pattern.email.send",
        "level": 3,
        "weight": 3,
        "steps": [
            {"attributes": {"application": "outlook"}}
        ],
        "patterns": [
            {"patternId": 1},
            {"patternId": 2},
            {"patternId": 3},
            {"patternId": 4},
            {"patternId": 5},
            {"patternId": 6},
        ],
        "tasks": [
        ],
        "pattern": "(P1 (? = . * (P2 | P3) ) (P2 | P3 | P4 | P5 | S0) *P6" ,
        "pattern_group": 1
    }
]
```

This exemplary second level pattern description is a second level pattern labeled as "Send Email", provided with a pattern weight of "3", a level of "3", a pattern code name "pattern.email.send", and a pattern definition (or pattern rule) that specifies how a set of first level patterns can be grouped or arranged to meet (or match) the pattern definition. In this example, the first level patterns referenced as patterns 1-6 (or P1-P6) noted in the exemplary second level pattern were the same first level patterns in the example above. Recall, pattern P1 is labeled "Email Open", pattern P2 is labeled "Email To", pattern P3 is labeled "Email CC", pattern P4 is labeled "Subject", pattern P5 is labeled "Email Body", and pattern P6 is labeled "Email Send". Here, in the exemplary second level pattern description, these first level patterns are flexibly combined to accommodate variants, such as due to ordering of actions, optional user actions, etc. that can generally occur when a user seeks to use Microsoft's Outlook email application to send an email.

This exemplary second level pattern description (or definition) has a JSON format. In the exemplary second level pattern description, the expression can be decoded to get information on combination of position, repetition and optional nature of the first level patterns allowed within the group pattern.

The exemplary second level pattern description includes a listing of the first level patterns P1-P6, The exemplary second level pattern being defined is identified as "pattern_group 1" and it specifies, using its notation, that the exemplary second level pattern starts with pattern P1 and must include one or more of patterns P2 and/or P3. Additionally, the exemplary second level pattern may contain any number of patterns P2, P3, P4 and P5 as well as step 0 (S0). Further still, the exemplary second level pattern ends with pattern P6.

A second level pattern description can also include steps, such as steps that are not replaced or represented by a first level pattern. In this exemplary second level pattern description includes step S0 which would be a step defined by a set of attributes. It may be that the step S0 is a general step, such as:

{"id": 0, "type": "step", "label": "email—steps", "attributes": {"application": "outlook"}} denoting any step with "application" as "outlook". This can be used to capture un-labelled steps within outlook application that may be in the recording.

Figure 8B:
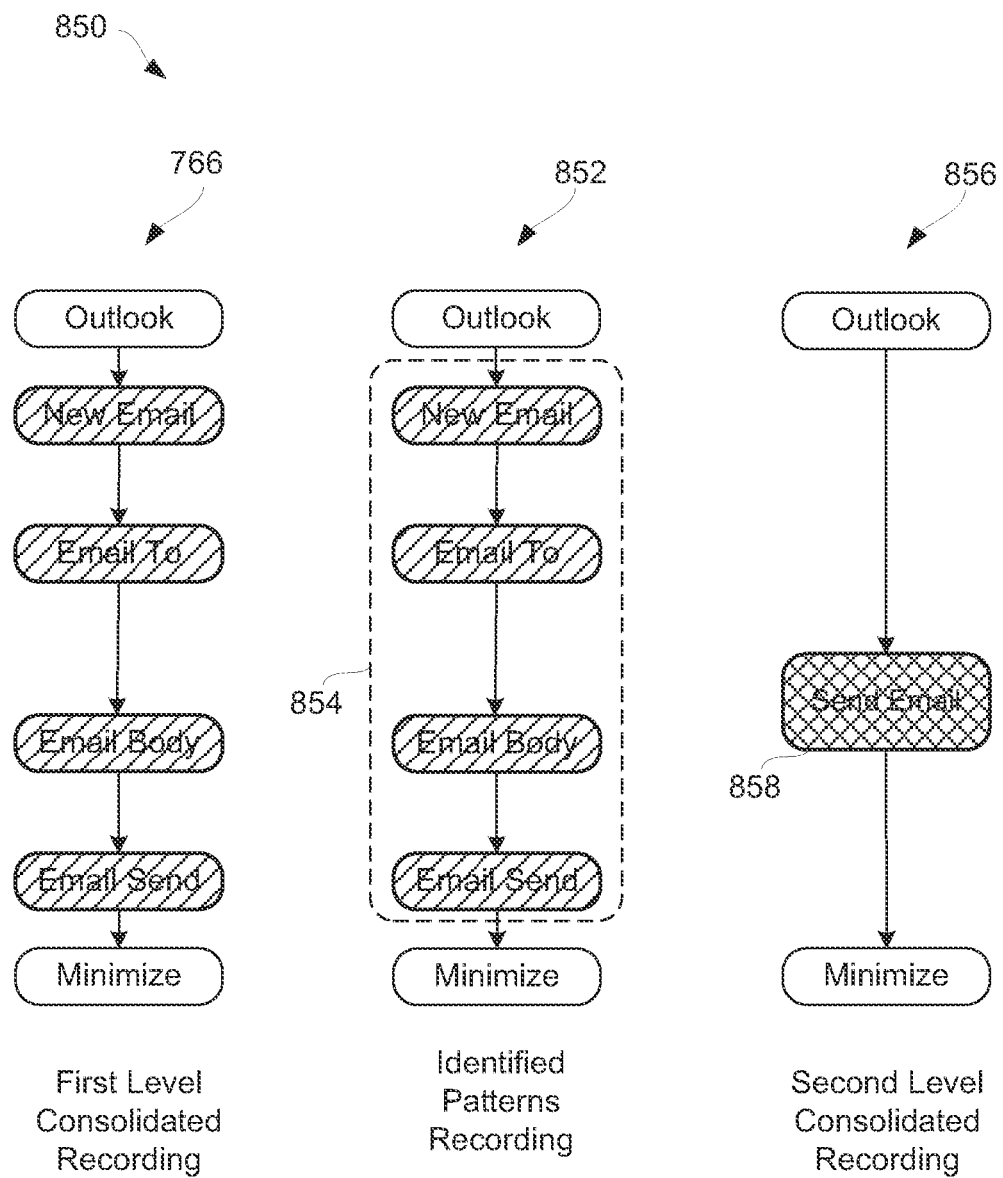
FIG. 8B is a diagram of an exemplary modification process according to one embodiment.

FIG. 8B is a diagram of an exemplary modification process 850 according to one embodiment. The exemplary modification process 850 provides a simplified example of further processing of the first level consolidated recording 766 produced by the exemplary modification process 750 illustrated in FIG. 7B. The further processing by the exemplary modification process 850 performs additional pattern checking to produce a second level consolidated recording 856. The second level consolidated recording 856 can still identify the steps of the raw recording 752 but now patterns therein are identified and, if recognized (e.g., previously defined), can be used to present the raw recording in a hierarchical organization, which, in this example, is associated with a user interacting with Microsoft's Outlook email application to send an email. In one embodiment, the second level modification processing 850 is performed at the group level; hence, the second level consolidated recording 856 can also be referred to as a group level consolidated recording.

The exemplary modification process 850 receives the first level consolidated recording 766 produced by the exemplary modification process 750 illustrated in FIG. 7B. The first level consolidated recording 766 can be processed by the exemplary modification process 850. At this point, the first level consolidated recording 766 can include steps from the raw recording 752 and/or identified first level patterns of steps that have been previously identified.

The exemplary modification process 850 can then discover identified patterns within the first level consolidated recording 766. In this embodiment, the exemplary modification process 850 evaluates the first level consolidated recording 766 and identifies one or more patterns present. The patterns being identified at this stage typically pertain to one or more first level patterns with or without one or more remaining ungrouped steps from the raw recording 752. These patterns are referred to a second level patterns. In one implementation, the second level patterns can be group level patterns. Typically, these patterns have been previously found to repeat frequently in various recordings associated with performing the same or similar processing tasks.

In this embodiment, the first level consolidated recording 766 includes a series of previously identified patterns, and such patterns are first level patterns. The exemplary modification process 850 can produce an identified patterns recording 852. By examining the first level consolidated recording 766 for second level patterns, a second level pattern 854 can be discovered within the first level consolidated recording 766. As shown in FIG. 8B, the identified second level pattern 854 within the identified patterns recording 852 is represented by dashed lines. In this example, the identified second level pattern 854 being identified includes a series of four (4) first level patterns, which are denoted by the pattern designator "New Email", the pattern designator "Email To", the pattern designator "Email Body", and the pattern designator "Email Send".

Finally, a second level consolidated recording 856 can be produced from the identified patterns recording 852. In this regard, the identified series of the first level patterns is deemed to be a previously determined pattern. As a result, the identified series of the first level patterns can be replaced in the second level consolidated recording 856 with a second level pattern designator 858 denoting "Send Email" as the sub-task being carried out by the various steps from the raw recording 752 that are grouped together via the first level patterns and the second level patterns.

Consequently, the second level consolidated recording 856 can be represented and/or visualized in a much more understandable fashion and allows a user to more easily understand the raw recording 752 and further allows for a more robust and efficient RPA processing by an RPA system. For example, using the second level consolidated recording 856, an RPA system can display the raw recording 752 as the second level consolidated recording 856. In doing so, in this example, the second level pattern designator 858 ("Send Email") is able to represent the series of four (4) first level patterns that was identified by the exemplary modification process 750 of FIG. 7B. Additionally, with the resulting hierarchical organization, the second level pattern designator 858 ("Send Email") in turn is also representing (6) steps from the raw recording 752 in a much more consolidated and understandable manner. From the second level consolidated recording 856, the second level pattern designator 858 ("New Email") can be selected to drill-down to see the underlying steps and/or first level patterns being represented by the second level pattern designator 858 ("New Email"). The RPA system might also generate SAPs to carry out steps corresponding to one or more second level patterns recognized within the recordings.

Figure 8C:
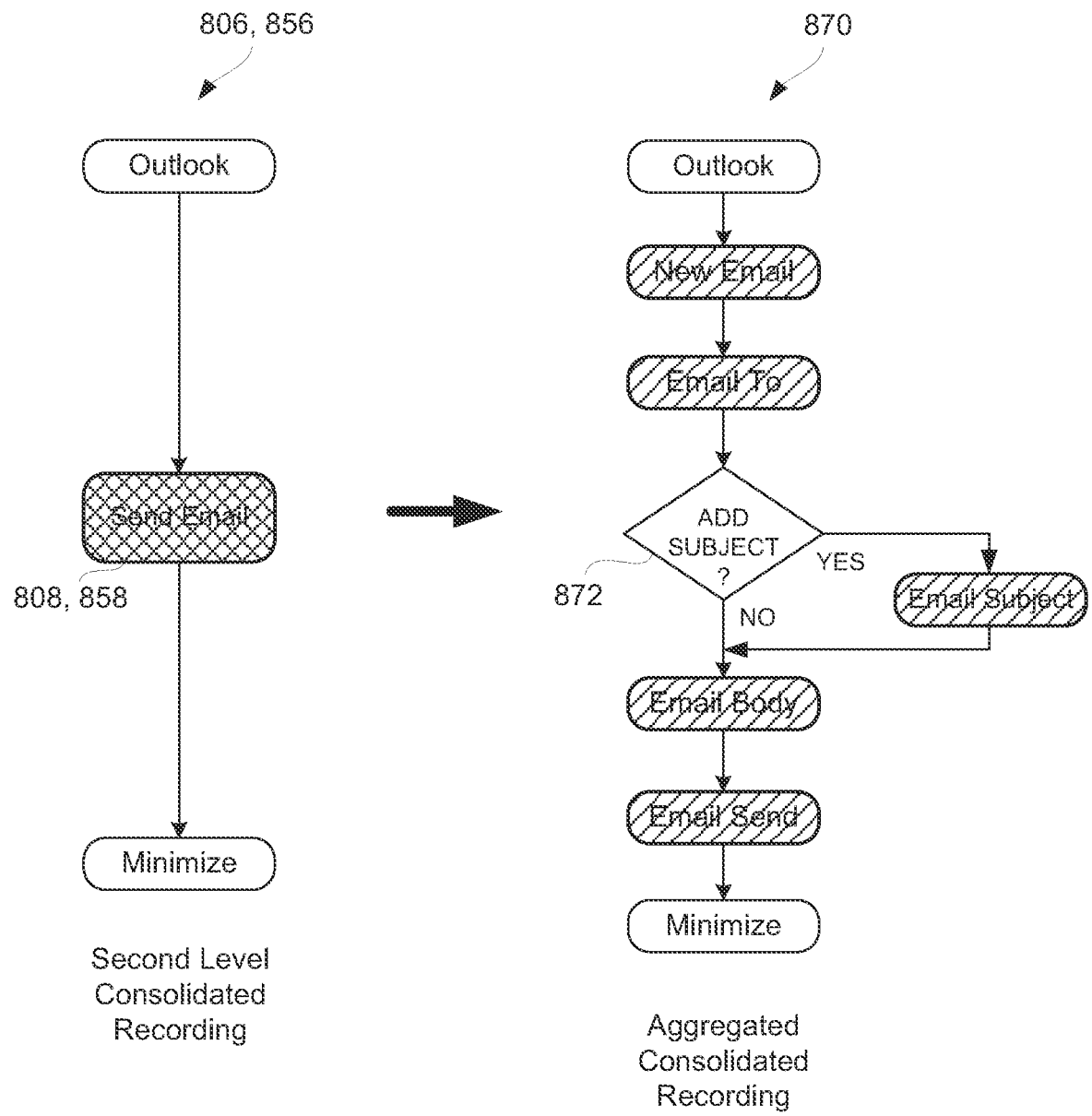
FIG. 8C is a diagram of an aggregated consolidated recording according to one embodiment.

FIG. 8C is a diagram of an aggregated consolidated recording 870 according to one embodiment. The aggregated consolidated recording 870 results from aggregation of (i) the second level consolidated recording 806 produced by the exemplary modification process 800, and (ii) the second level consolidated recording 856 produced by the exemplary modification process 850. Both of these second level consolidated recordings 806, 856 conform to or match the second level pattern labeled "Send Email". As a result, these second level consolidated recordings 806, 856 can be aggregated by aggregation processing such that they can be represented by the aggregated consolidated recording 870. In this regard, since the recordings being aggregated are not identical and instead have slight variations, the aggregated consolidated recording 870 can be adapted to accommodate for such variations.

In this exemplary embodiment, the variation has to do with whether an "Email Subject" first level pattern is present in the recordings. Here, the first level consolidated recording 718 produced by the exemplary modification process 700 illustrated in FIG. 7A includes an "Email Subject" first level pattern. Therefore, the "Email Subject" first level pattern is thus within the second level "Send Email" pattern 808 of the second level consolidated recording 806. On the other hand, the first level consolidated recording 766 produced by the exemplary modification process 750 illustrated in FIG. 7B does not include an "Email Subject" first level pattern. Therefore, the "Email Subject" first level pattern is thus not within the second level "Send Email" pattern 858 of the second level consolidated recording 856. Consequently, the aggregated consolidated recording 870 can include a decision 872 (e.g., branch) to accommodate the variation between the aggregated recordings. By doing so, the aggregated consolidated recording 870 can represent in a hierarchical manner both raw recordings 702 and 752. The decision 872 determines whether the associated recording should include an Add Subject, meaning that the email being produced includes a "Subject". If the decision 872 determines that first level consolidated recording 718 for the raw recording 702 does include the first level pattern "Email Subject", then the decision 872 follows the "Yes" branch such that the "Email Subject" first level pattern is provided, and thus conforms to the first level consolidated recording 718. In contrast, if the decision 872 determines that first level consolidated recording 758 for the raw recording 752 does not include the first level pattern "Email Subject", then the decision 872 follows the "No" branch such that the "Email Subject" first level pattern is not provided, and thus conforms to the first level consolidated recording 766. Here, the variation between the first level consolidated recording 702, 752 is accommodated for in the aggregated consolidated recording 870.

Additionally, when hierarchically visualizing the raw recordings 702 and 752 in the second level, the raw recordings 702 and 752 can, for example, be illustrated in a manner similar to that shown in the second level consolidated recordings 806, 856. Following visualization of the aggregated recording in the second level, if the raw recordings 702 and 752 are to be visualized in the first level, then the raw recordings 702 and 752 can, for example, be illustrated in a manner similar to that shown in the aggregated consolidated recording 870, which represents both the raw recordings 702 and 752 in the first level.

A user of the RPA system, or the RPA system itself, can generate the hierarchical visualization of recordings at any level, a first level or a second level. As rendered, the hierarchical nature of the consolidated recording can allow the recordings to be presented on a display device in a user-friendly manner, such that users can easily understand the task or sub-task being performed by the recordings. Moreover, the user or RPA system can facilitate the transition of visualizing the recording in any of the levels. By organizing the underlying recording steps in a hierarchical manner, the RPA system can create software automation processes that are useful and more flexible. For example, this can enable the RPA system to effectively create SAPs using aggregated pattern recordings.

In one embodiment, the resulting aggregated consolidated recording, such as aggregated consolidated recording 870, can have a digital representation as a linear flowchart. A linear flowchart describes the sequence of steps in a recording, in this case an aggregated consolidated recording 870. The linear flowchart can provide a textual outline. Optionally, the linear flowchart can be presented visually by rendering a textual outline. A linear flowchart can provide a visual representation of one recording or an aggregation of a plurality of recordings in a simple flow that is easy to understand while traveling from top to the bottom of the flow. In one embodiment, aggregated consolidated recording 870 is the aggregation of two second level consolidated recordings 806, 856 that are respectively derived from the two distinct raw recordings 702 and 752. The digital representation is an aggregated or merged digital representation. The linear flowcharts provide a textual outline for the merged recording that is code compatible. For example, the textual outline for the linear flowcharts can be presented in JSON format. As a result, the aggregated or merged digital representation can be readily displayed as a visual flow diagram, such as the visual flow diagram graphically depicted in FIG. 8C for the aggregated consolidated recording 870. The aggregated consolidated recording 870 can also facilitate creation of a SAP. An exemplary flowchart for the aggregated consolidated recording 870 is provided below:

```
{
    "type": "FLOW_CHART",
    "version": 4,
    "recordings": [
        1,
        2
    ],
    "nodes": [
        {
            "uid": "00000000-0000-0000-0000-000000000001",
            "type": "STEP",
            "label": "",
            "recordingSteps": [
                "1-2",
                "2-2"
            ]
        },
        {
            "uid": "00000000-0000-0000-0000-000000000018",
            "type": "GROUP",
            "label": "",
            "action": "EMAIL_CREATE",
            "groups": [
                {
                    "uid": "00000000-0000-0000-0000-000000000019",
                    "type": "NODE_GROUP",
                    "nodes": [
                        {
                            "uid": "00000000-0000-0000-0000-000000000002",
                            "type": "GROUP",
                            "label": "",
                            "action": "EMAIL_OPEN",
                            "groups": [
                                {
                                    "uid": "00000000-0000-0000-0000-a00000000005",
                                    "type": "NODE_GROUP",
                                    "nodes": [
                                        {
                                            "uid": "00000000-0000-0000-0000-a00000000006",
                                            "type": "STEP",
                                            "label": "",
                                            "recordingSteps": [
                                                "1-2",
                                                "2-2"
                                            ]
                                        }
                                    ]
                                }
                            ]
                        }
                    ]
                },
                {
                    "uid": "00000000-0000-0000-0000-000000000008",
                    "type": "GROUP",
                    "label": "",
                    "action": "EMAIL_TO",
                    "groups": [
                        {
                            "uid": "00000000-0000-0000-0000-000000000007",
                            "type": "NODE_GROUP",
                            "nodes": [
                                {
                                    "uid": "00000000-0000-0000-0000-000000000004",
                                    "type": "STEP",
                                    "label": "",
                                    "recordingSteps": [
                                        "1-3",
                                        "2-3"
                                    ]
```

```
            },
            {
                "uid": "00000000-0000-0000-
0000-000000000005",
                "type": "STEP",
                "label": "",
                "recordingSteps": [
                    "1-4",
                    "2-4"
                ]
            }
        ]
    }
    ]
},
{
    "uid": "00000000-0000-0000-0000-000000000009",
    "type": "IF",
    "label": "",
    "variable":
    "branches": [
        {
            "uid": "00000000-0000-0000-0000-
000000000010",
            "type": "NODE_BRANCH",
            "label": "",
            "condition": "",
            "nodes": [
                {
                    "uid": "00000000-0000-0000-
0000-a00000000014",
                    "type": "GROUP",
                    "label": "",
                    "action": "EMAIL_SUBJECT",
                    "groups": [
                        {
                            "uid": "00000000-0000-
0000-0000-a00000000015",
                            "type": "NODE_GROUP",
                            "nodes": [
                                {
                                    "uid":
"00000000-0000-0000-0000-a00000000016",
                                    "type":
"STEP",
                                    "label": "",
"recordingSteps": [
                                        "1-5"
                                    ]
                                }
                            ]
                        }
                    ]
                }
            ]
        },
        {
            "uid": "00000000-0000-0000-0000-
000000000011",
            "type": "NODE_BRANCH",
            "label": "",
            "condition": "",
            "nodes": [ ]
        }
    ]
},
{
    "uid": "00000000-0000-0000-0000-000000000017",
    "type": "GROUP",
    "label": "",
    "action": "EMAIL_BODY",
    "groups": [
        {
            "uid": "00000000-0000-0000-0000-
000000000016",
            "type": "NODE_GROUP",
            "nodes": [
                {
                    "uid": "00000000-0000-0000-
0000-000000000012",
                    "type": "STEP",
                    "label": "",
                    "recordingSteps": [
                        "1-6",
                        "2-5"
                    ]
                },
                {
                    "uid": "00000000-0000-0000-
0000-000000000013",
                    "type": "STEP",
                    "label": "",
                    "recordingSteps": [
                        "1-7",
                        "2-6"
                    ]
                }
            ]
        }
    ]
},
{
    "uid": "00000000-0000-0000-0000-000000000022",
    "type": "GROUP",
    "label": "",
    "action": "EMAIL_SEND",
    "groups": [
        {
            "uid": "00000000-0000-0000-0000-
a00000000021",
            "type": "NODE_GROUP",
            "nodes": [
                {
                    "uid": "00000000-0000-0000-
0000-a00000000020",
                    "type": "STEP",
                    "label": "",
                    "recordingSteps": [
                        "1-8",
                        "2-7"
                    ]
                }
            ]
        }
    ]
},
{
    "uid": "00000000-0000-0000-0000-000000000023",
    "type": "STEP",
    "label": "",
    "recordingSteps": [
        "1-9",
        "2-8"
    ]
}
]
}
```

Figure 9A:
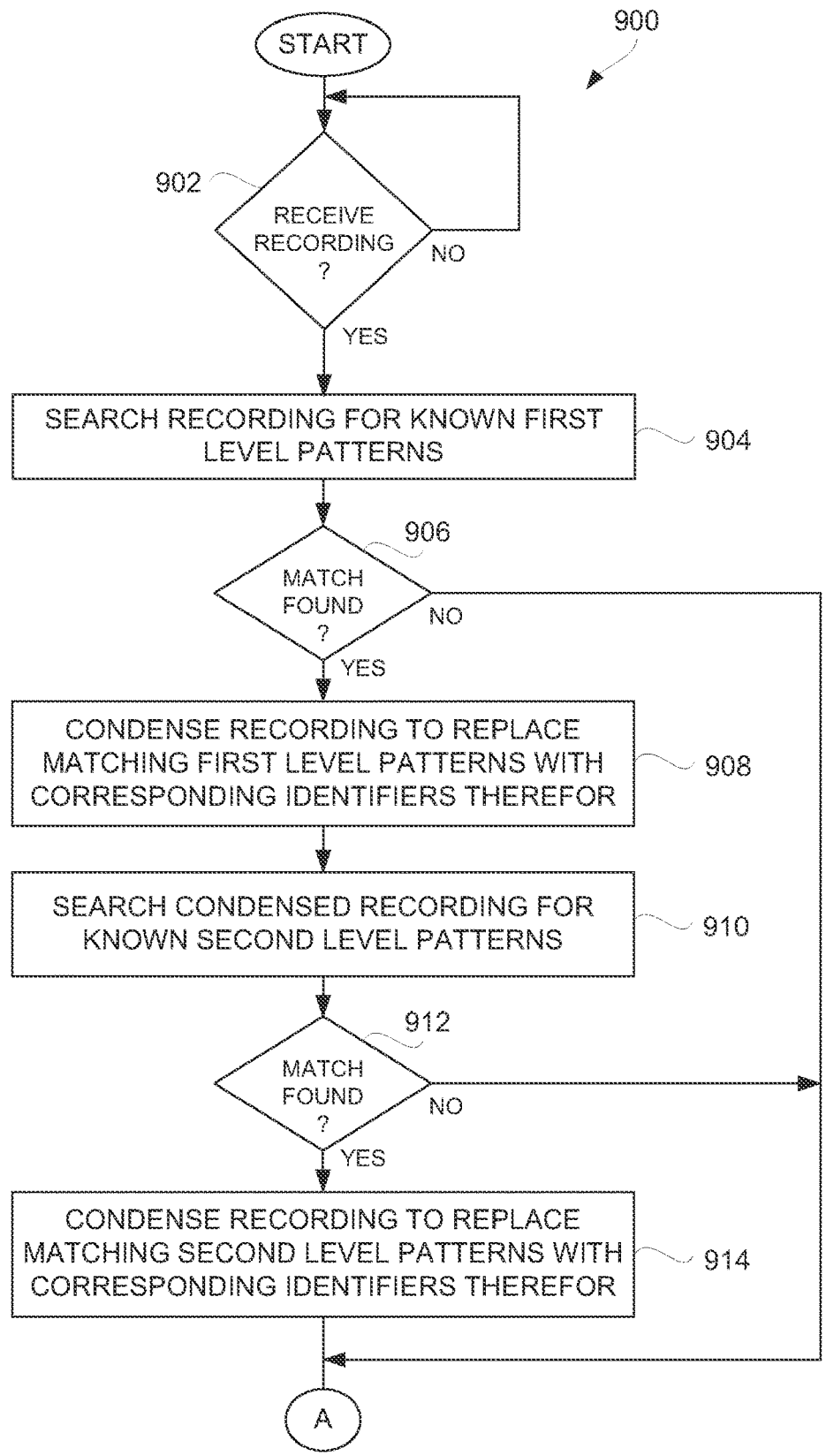
FIGS. 9A and 9B are flow diagrams of a recording consolidation process according to one embodiment.
Figure 9B:
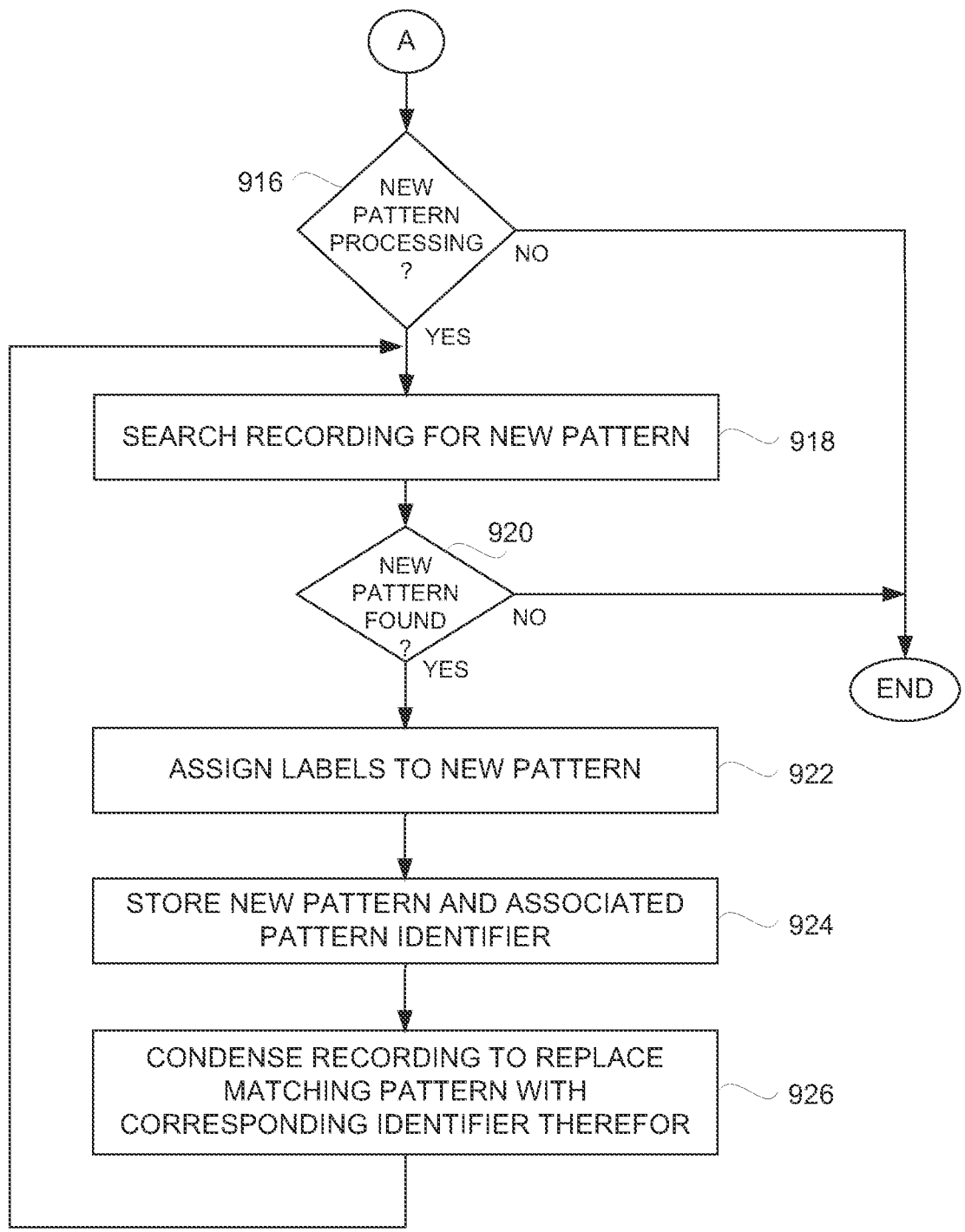

FIGS. 9A and 9B illustrate flow diagrams of a recording consolidation process 900 according to one embodiment. The recording consolidation process 900 can be performed by a recording modification sub-system, such as the recording modification sub-system 212 illustrated in FIG. 2 or the recording modification sub-system 500 illustrated in FIG. 5.

The recording consolidation process 900 can begin with a decision 902 that determines whether a recording has been received. When the decision 902 determines that a recording has not been received, the recording consolidation process 900 can await receipt of such a recording. On the other hand, when the decision 902 determines that a recording has been received, the recording consolidation process 900 can process the recording in an effort to consolidate its steps into task or sub-tasks.

After it is determined that a recording is received at 902, the recording can be searched 904 for known first level patterns. In one implementation, the first level patterns are step level patterns. Here, the recording consolidation process 900 can examine the recording to search 904 for known first level patterns. The known first level patterns may be, for example, first level patterns that have been previously found in like or similar recordings. Next, a decision 906 can determine whether a matching first level pattern has been found within the recording. When the decision 906 determines that a match has been found, the recording can be condensed 908 to replace the sequence of steps in the recording that matches the first level pattern found within the recording with the corresponding identifier (e.g., label) for the matched first level pattern.

After processing the recording for identification and consolidation with respect to first level patterns, the recording consolidation process 900 can perform processing to process the recording for identification and consolidation with respect to second level patterns. In one implementation, the second level patterns are group level patterns. In this regard, the condensed recording can be searched 910 for known second level patterns. A decision 912 can then determine whether a match has been found. When the decision 912 determines that a matching second level pattern has been found, the condensed recording can be further condensed 914 to replace the sequence of first level patterns and/or steps in the condensed recording that matches the second level patterns found within the condensed recording with the corresponding identifier (e.g., label) for the matched second level pattern.

Following the block 914, the recording consolidation process 900 can proceed to a decision 916 illustrated in FIG. 9B to further process the recording (after being condensed at blocks 908 and 914) to search for new patterns. Additionally, when the decision 906 determines that no matches been found, or likewise when the decision 912 determines that no matches been found, the recording consolidation process 900 can proceed to the decision 916.

The decision 916 can determine whether new pattern processing should be performed. When the decision 916 determines that new pattern processing should be performed, the recording can be searched 918 for new patterns. A decision 920 can then determine whether one or more new patterns have been found. When the decision 920 determines that a new pattern has been found, a label can be assigned 922 to each new pattern found. Then, the new pattern and its label can be stored 924. Here, the storage of the new pattern and the label can be made available to a central repository so that the new pattern and label can be utilized as a known pattern and used for subsequent processing efforts locally or centrally.

Next, the recording can be again condensed 926 to replace the sequence in the recording (whether from the raw recording or condensed recording or some combination thereof) that matches the new pattern found within the recording with the corresponding identifier (e.g., label) for the new pattern. Once condensed 926, the recording consolidation process 900 can return to repeat the block 918 and subsequent blocks to continue to search the recording for new patterns. When the decision 920 determines that no new pattern is found, the recording consolidation process 900 can end. Additionally, if the decision 916 determines that new pattern processing is not to be performed, the recording consolidation process 900 can end.

Although the recording consolidation process 900 sequentially perform two distinct levels of pattern matching, namely, the first level pattern matching and the second level pattern matching, it should be understood that there can be additional levels of pattern matching, such as a third level of pattern matching, etc.

The various aspects disclosed herein can be utilized with or by robotic process automation systems. Exemplary robotic process automation systems and operations thereof are detailed below.

Figure 10:
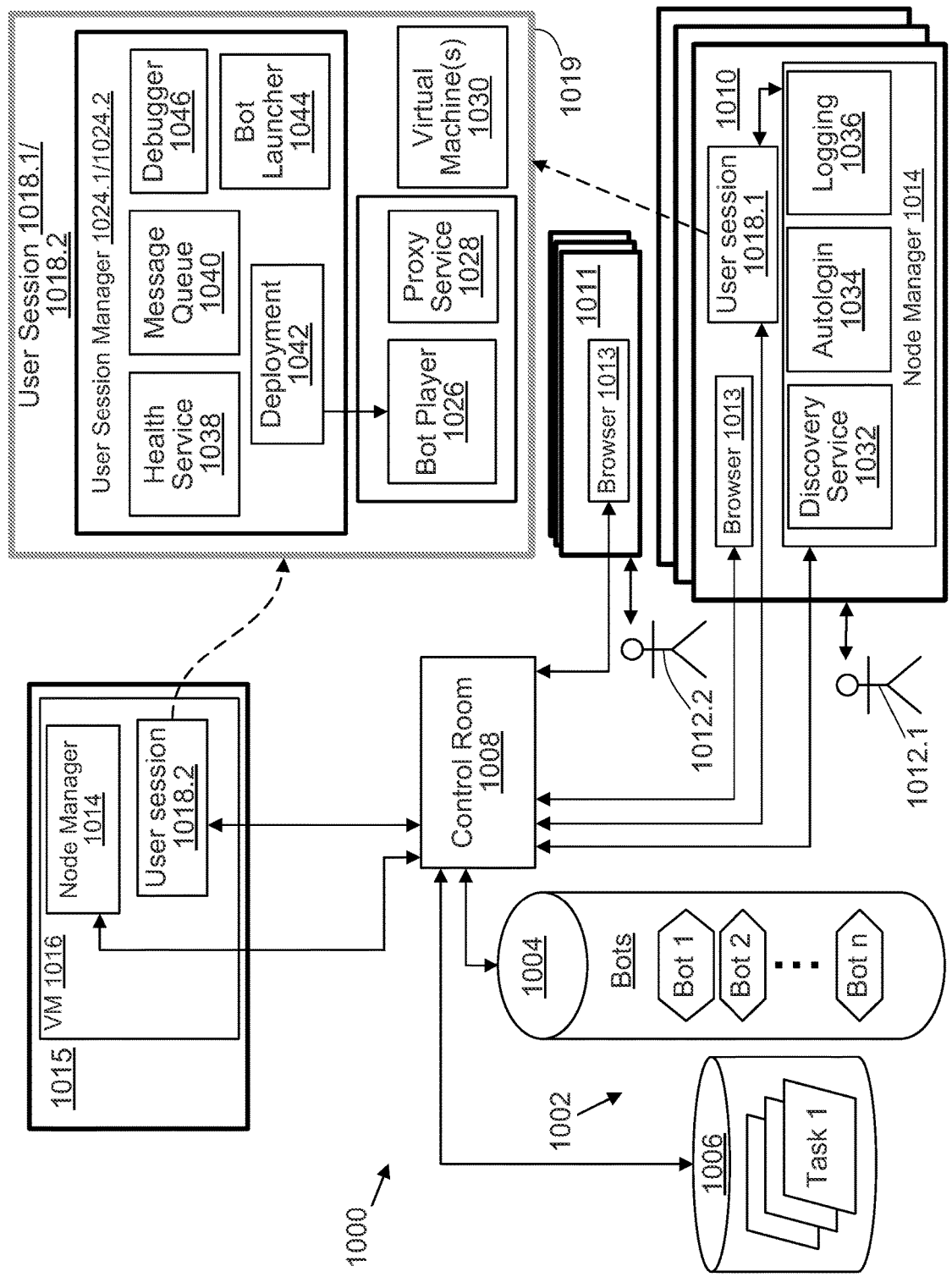
FIG. 10 is a block diagram of a robotic process automation (RPA) system according to one embodiment.

FIG. 10 is a block diagram of a robotic process automation (RPA) system 1000 according to one embodiment. The RPA system 1000 includes data storage 1002. The data storage 1002 can store a plurality of software robots 1004, also referred to as bots (e.g., Bot 1, Bot 2, . . . , Bot n, where n is an integer). The software robots 1004 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 1026), on which a bot will execute or is executing. The data storage 1002 can also stores a plurality of work items 1006. Each work item 1006 can pertain to processing executed by one or more of the software robots 1004.

The RPA system 1000 can also include a control room 1008. The control room 1008 is operatively coupled to the data storage 1002 and is configured to execute instructions that, when executed, cause the RPA system 1000 to respond to a request from a client device 1010 that is issued by a user 1012.1. The control room 1008 can act as a server to provide to the client device 1010 the capability to perform an automation task to process a work item from the plurality of work items 1006. The RPA system 1000 is able to support multiple client devices 1010 concurrently, each of which will have one or more corresponding user session(s) 1018, which provides a context. The context can, for example, include security, permissions, audit trails, etc. to define the permissions and roles for bots operating under the user session 1018. For example, a bot executing under a user session, cannot access any files or use any applications that the user, under whose credentials the bot is operating, does not have permission to do so. This prevents any inadvertent or malicious acts from a bot under which bot 1004 executes.

The control room 1008 can provide, to the client device 1010, software code to implement a node manager 1014. The node manager 1014 executes on the client device 1010 and provides a user 1012 a visual interface via browser 1013 to view progress of and to control execution of automation tasks. It should be noted that the node manager 1014 can be provided to the client device 1010 on demand, when required by the client device 1010, to execute a desired automation task. In one embodiment, the node manager 1014 may remain on the client device 1010 after completion of the requested automation task to avoid the need to download it again. In another embodiment, the node manager 1014 may be deleted from the client device 1010 after completion of the requested automation task. The node manager 1014 can also maintain a connection to the control room 1008 to inform the control room 1008 that device 1010 is available for service by the control room 1008, irrespective of whether a live user session 1018 exists. When executing a bot 1004, the node manager 1014 can impersonate the user 1012 by employing credentials associated with the user 1012.

The control room 1008 initiates, on the client device 1010, a user session 1018 (seen as a specific instantiation 1018.1) to perform the automation task. The control room 1008 retrieves the set of task processing instructions 1004 that correspond to the work item 1006. The task processing instructions 1004 that correspond to the work item 1006 can execute under control of the user session 1018.1, on the client device 1010. The node manager 1014 can provide update data indicative of status of processing of the work item to the control room 1008. The control room 1008 can terminate the user session 1018.1 upon completion of processing of the work item 1006. The user session 1018.1 is shown in further detail at 1019, where an instance 1024.1 of user session manager 1024 is seen along with a bot player 1026, proxy service 1028, and one or more virtual machine(s) 1030, such as a virtual machine that runs Java® or Python®. The user session manager 1024 provides a generic user session context within which a bot 1004 executes.

The bots 1004 execute on a bot player, via a computing device, to perform the functions encoded by the bot. Some or all of the bots 1004 may, in certain embodiments, be located remotely from the control room 1008. Moreover, the devices 1010 and 1011, which may be conventional computing devices, such as for example, personal computers, server computers, laptops, tablets and other portable computing devices, may also be located remotely from the control room 1008. The devices 1010 and 1011 may also take the form of virtual computing devices. The bots 1004 and the work items 1006 are shown in separate containers for purposes of illustration but they may be stored in separate or the same device(s), or across multiple devices. The control room 1008 can perform user management functions, source control of the bots 1004, along with providing a dashboard that provides analytics and results of the bots 1004, performs license management of software required by the bots 1004 and manages overall execution and management of scripts, clients, roles, credentials, security, etc. The major functions performed by the control room 1008 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 1008 is shown generally for simplicity of explanation. Multiple instances of the control room 1008 may be employed where large numbers of bots are deployed to provide for scalability of the RPA system 1000.

In the event that a device, such as device 1011 (e.g., operated by user 1012.2) does not satisfy the minimum processing capability to run a node manager 1014, the control room 1008 can make use of another device, such as device 1015, that has the requisite capability. In such case, a node manager 1014 within a Virtual Machine (VM), seen as VM 1016, can be resident on the device 1015. The node manager 1014 operating on the device 1015 can communicate with browser 1013 on device 1011. This approach permits RPA system 1000 to operate with devices that may have lower processing capability, such as older laptops, desktops, and portable/mobile devices such as tablets and mobile phones. In certain embodiments the browser 1013 may take the form of a mobile application stored on the device 1011. The control room 1008 can establish a user session 1018.2 for the user 1012.2 while interacting with the control room 1008 and the corresponding user session 1018.2 operates as described above for user session 1018.1 with user session manager 1024 operating on device 1010 as discussed above.

In certain embodiments, the user session manager 1024 provides five functions. First is a health service 1038 that maintains and provides a detailed logging of bot execution including monitoring memory and CPU usage by the bot and other parameters such as number of file handles employed. The bots 1004 can employ the health service 1038 as a resource to pass logging information to the control room 1008. Execution of the bot is separately monitored by the user session manager 1024 to track memory, CPU, and other system information. The second function provided by the user session manager 1024 is a message queue 1040 for exchange of data between bots executed within the same user session 1018. The third function is a deployment service (also referred to as a deployment module) 1042 that connects to the control room 1008 to request execution of a requested bot 1004. The deployment service 1042 can also ensure that the environment is ready for bot execution, such as by making available dependent libraries. The fourth function is a bot launcher 1044 which can read metadata associated with a requested bot 1004 and launch an appropriate container and begin execution of the requested bot. The fifth function is a debugger service 1046 that can be used to debug bot code.

The bot player 1026 can execute, or play back, a sequence of instructions encoded in a bot. The sequence of instructions can, for example, be captured by way of a recorder when a human performs those actions, or alternatively the instructions are explicitly coded into the bot. These instructions enable the bot player 1026, to perform the same actions as a human would do in their absence. In one implementation, the instructions can compose of a command (or action) followed by set of parameters. For example, Open Browser is a command and a URL would be the parameter for it to launch a web resource. Proxy service 1028 can enable integration of external software or applications with the bot to provide specialized services. For example, an externally hosted artificial intelligence system can enable the bot to understand the meaning of a "sentence."

The user 1012.1 can interact with node manager 1014 via a conventional browser 1013 which employs the node manager 1014 to communicate with the control room 1008. When the user 1012.1 logs in from the client device 1010 to the control room 1008 for the first time, the user 1012.1 can be prompted to download and install the node manager 1014 on the device 1010, if one is not already present. The node manager 1014 can establish a web socket connection to the user session manager 1024, deployed by the control room 1008 that lets the user 1012.1 subsequently create, edit, and deploy the bots 1004.

Figure 11:
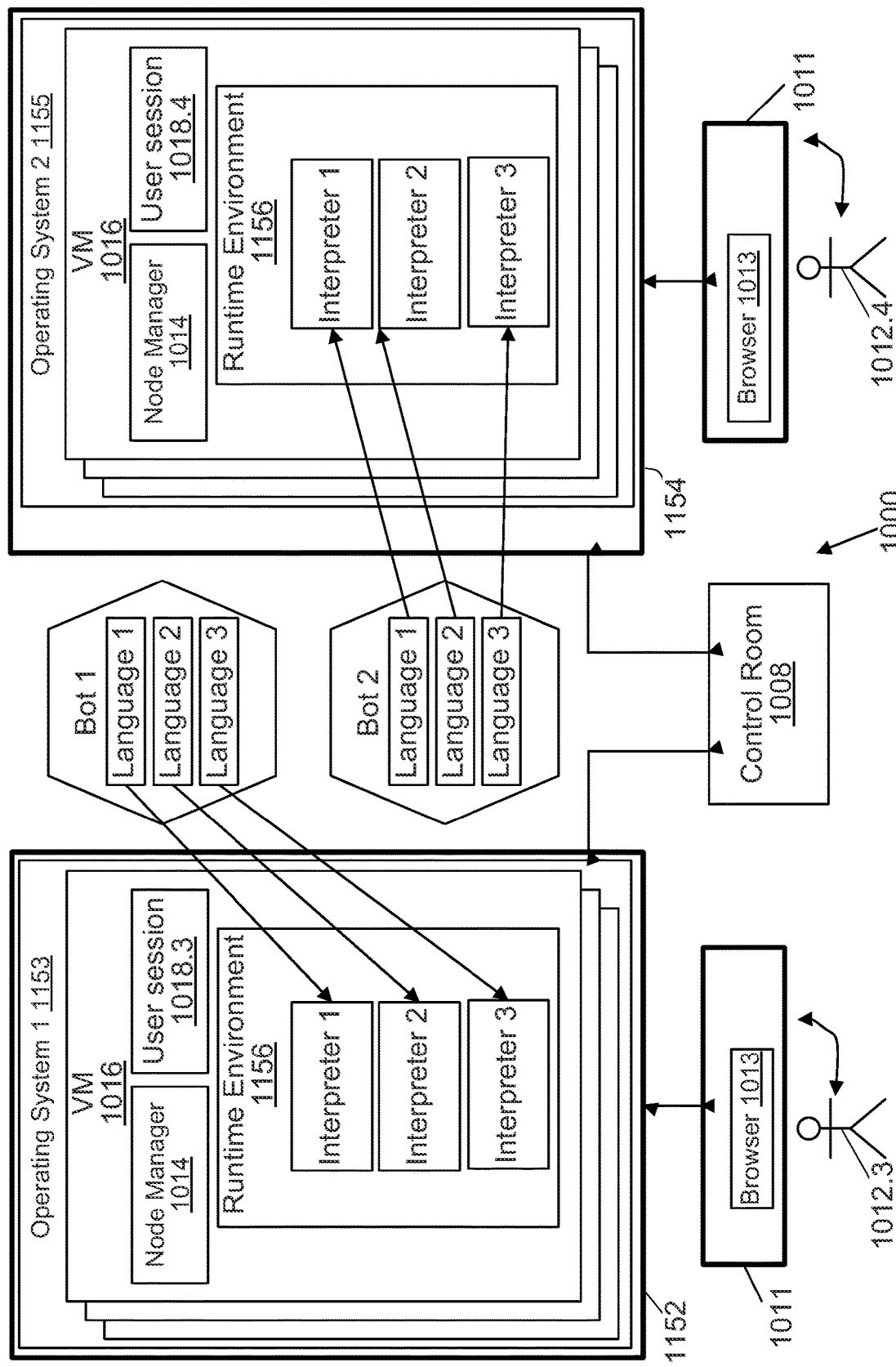
FIG. 11 is a block diagram of a generalized runtime environment for bots in accordance with another embodiment of the RPA system illustrated in FIG. 10.

FIG. 11 is a block diagram of a generalized runtime environment for bots 1004 in accordance with another embodiment of the RPA system 1000 illustrated in FIG. 10. This flexible runtime environment advantageously permits extensibility of the platform to enable use of various languages in encoding bots. In the embodiment of FIG. 11, RPA system 1000 generally operates in the manner described in connection with FIG. 10, except that in the embodiment of FIG. 11, some or all of the user sessions 1018 execute within a virtual machine 1016. This permits the bots 1004 to operate on an RPA system 1000 that runs on an operating system different from an operating system on which a bot 1004 may have been developed. For example, if a bot 1004 is developed on the Windows® operating system, the platform agnostic embodiment shown in FIG. 11 permits the bot 1004 to be executed on a device 1152 or 1154 executing an operating system 1153 or 1155 different than Windows®, such as, for example, Linux. In one embodiment, the VM 1016 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 11, multiple devices 1152 can execute operating system 1, 1153, which may, for example, be a Windows® operating system. Multiple devices 1154 can execute operating system 2, 1155, which may, for example, be a Linux® operating system. For simplicity of explanation, two different operating systems are shown, by way of example and additional operating systems such as the macOS®, or other operating systems may also be employed on devices 1152, 1154 or other devices. Each device 1152, 1154 has installed therein one or more VM's 1016, each of which can execute its own operating system (not shown), which may be the same or different than the host operating system 1153/1155. Each VM 1016 has installed, either in advance, or on demand from control room 1008, a node manager 1014. The embodiment illustrated in FIG. 11 differs from the embodiment shown in FIG. 10 in that the devices 1152 and 1154 have installed thereon one or more VMs 1016 as described above, with each VM 1016 having an operating system installed that may or may not be compatible with an operating system required by an automation task. Moreover, each VM has installed thereon a runtime environment 1156, each of which has installed thereon one or more interpreters (shown as interpreter 1, interpreter 2, interpreter 3). Three interpreters are shown by way of example but any run time environment 1156 may, at any given time, have installed thereupon less than or more than three different interpreters. Each interpreter 1156 is specifically encoded to interpret instructions encoded in a particular programming language. For example, interpreter 1 may be encoded to interpret software programs encoded in the Java® programming language, seen in FIG. 11 as language 1 in Bot 1 and Bot 2. Interpreter 2 may be encoded to interpret software programs encoded in the Python® programming language, seen in FIG. 11 as language 2 in Bot 1 and Bot 2, and interpreter 3 may be encoded to interpret software programs encoded in the R programming language, seen in FIG. 11 as language 3 in Bot 1 and Bot 2.

Turning to the bots Bot 1 and Bot 2, each bot may contain instructions encoded in one or more programming languages. In the example shown in FIG. 11, each bot can contain instructions in three different programming languages, for example, Java®, Python® and R. This is for purposes of explanation and the embodiment of FIG. 11 may be able to create and execute bots encoded in more or less than three programming languages. The VMs 1016 and the runtime environments 1156 permit execution of bots encoded in multiple languages, thereby permitting greater flexibility in encoding bots. Moreover, the VMs 1016 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 1008 will select a device with a VM 1016 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 12:
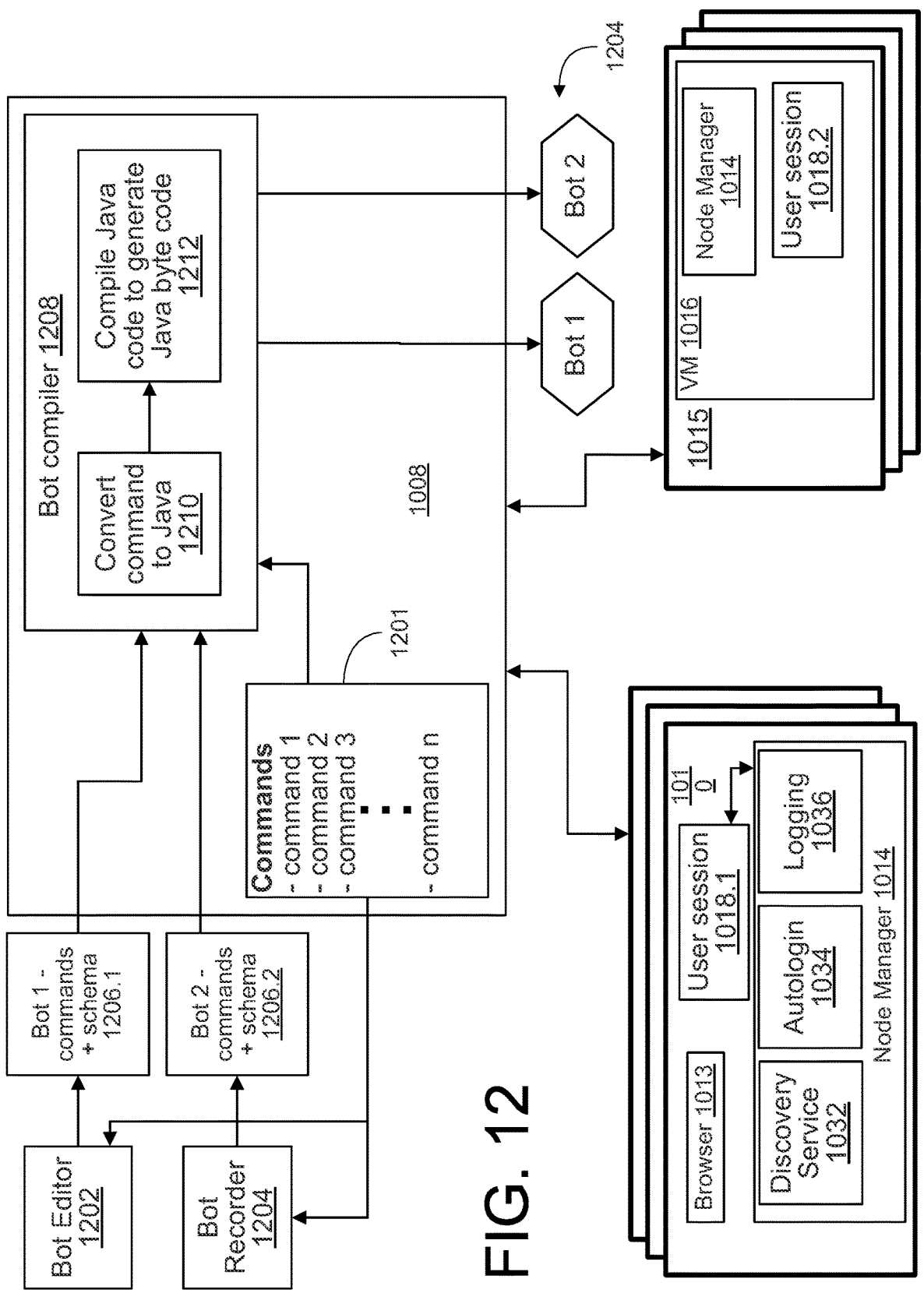
FIG. 12 illustrates yet another embodiment of the RPA system of FIG. 10 configured to provide platform independent sets of task processing instructions for bots.

FIG. 12 illustrates a block diagram of yet another embodiment of the RPA system 1000 of FIG. 10 configured to provide platform independent sets of task processing instructions for bots 1004. Two bots 1004, bot 1 and bot 2 are shown in FIG. 12. Each of bots 1 and 2 are formed from one or more commands 1201, each of which specifies a user level operation with a specified application program, or a user level operation provided by an operating system. Sets of commands 1206.1 and 1206.2 may be generated by bot editor 1202 and bot recorder 1204, respectively, to define sequences of application-level operations that are normally performed by a human user. The bot editor 1202 may be configured to combine sequences of commands 1201 via an editor. The bot recorder 1204 may be configured to record application-level operations performed by a user and to convert the operations performed by the user to commands 1201. The sets of commands 1206.1 and 1206.2 generated by the editor 1202 and the recorder 1204 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 1008 operates to compile, via compiler 1208, the sets of commands generated by the editor 1202 or the recorder 1204 into platform independent executables, each of which is also referred to herein as a bot JAR (Java ARchive) that perform application-level operations captured by the bot editor 1202 and the bot recorder 1204. In the embodiment illustrated in FIG. 12, the set of commands 1206, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 1010 and/or 1015 to perform the encoded application-level operations that are normally performed by a human user.

Figure 13:
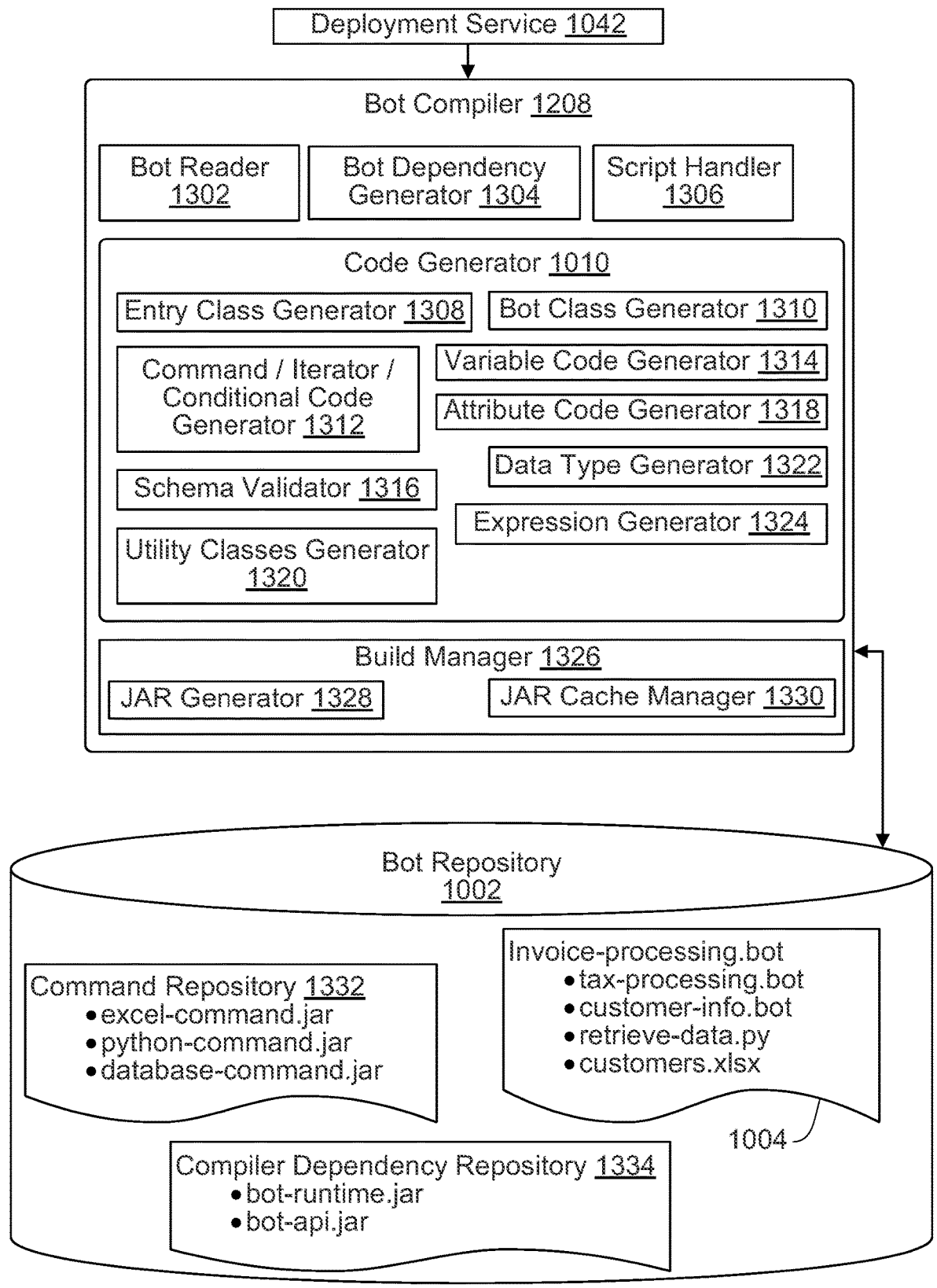
FIG. 13 is a block diagram illustrating details of one embodiment of the bot compiler illustrated in FIG. 12.

FIG. 13 is a block diagram illustrating details of one embodiment of the bot compiler 1208 illustrated in FIG. 12. The bot compiler 1208 accesses one or more of the bots 1004 from the data storage 1002, which can serve as bot repository, along with commands 1201 that are contained in a command repository 1332. The bot compiler 1008 can also access compiler dependency repository 1334. The bot compiler 1008 can operate to convert each command 1201 via a code generator module 1210 to an operating system independent format, such as a Java command. The bot compiler 1008 then compiles each operating system independent format command into byte code, such as Java byte code, to create a bot JAR. The convert command to Java module 1210 is shown in further detail in in FIG. 13 by JAR generator 1328 of a build manager 1326. The compiling to generate Java byte code module 1212 can be provided by the JAR generator 1328. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 12, deployment service 1042 can be responsible to trigger the process of bot compilation and then once a bot has compiled successfully, to execute the resulting bot JAR on selected devices 1010 and/or 1015. The bot compiler 1208 can comprises a number of functional modules that, when combined, generate a bot 1004 in a JAR format. A bot reader 1302 loads a bot file into memory with class representation. The bot reader 1302 takes as input a bot file and generates an in-memory bot structure. A bot dependency generator 1304 identifies and creates a dependency graph for a given bot. It includes any child bot, resource file like script, and document or image used while creating a bot. The bot dependency generator 1304 takes, as input, the output of the bot reader 1302 and provides, as output, a list of direct and transitive bot dependencies. A script handler 1306 handles script execution by injecting a contract into a user script file. The script handler 1306 registers an external script in manifest and bundles the script as a resource in an output JAR. The script handler 1306 takes, as input, the output of the bot reader 1302 and provides, as output, a list of function pointers to execute different types of identified scripts like Python, Java, VB scripts.

An entry class generator 1308 can create a Java class with an entry method, to permit bot execution to be started from that point. For example, the entry class generator 1308 takes, as an input, a parent bot name, such "Invoice-processing-.bot" and generates a Java class having a contract method with a predefined signature. A bot class generator 1310 can generate a bot class and orders command code in sequence of execution. The bot class generator 1310 can take, as input, an in-memory bot structure and generates, as output, a Java class in a predefined structure. A Command/Iterator/Conditional Code Generator 1312 wires up a command class with singleton object creation, manages nested command linking, iterator (loop) generation, and conditional (If/Else If/Else) construct generation. The Command/Iterator/Conditional Code Generator 1312 can take, as input, an in-memory bot structure in JSON format and generates Java code within the bot class. A variable code generator 1314 generates code for user defined variables in the bot, maps bot level data types to Java language compatible types, and assigns initial values provided by user. The variable code generator 1314 takes, as input, an in-memory bot structure and generates Java code within the bot class. A schema validator 1316 can validate user inputs based on command schema and includes syntax and semantic checks on user provided values. The schema validator 1316 can take, as input, an in-memory bot structure and generates validation errors that it detects. The attribute code generator 1318 can generate attribute code, handles the nested nature of attributes, and transforms bot value types to Java language compatible types. The attribute code generator 1318 takes, as input, an in-memory bot structure and generates Java code within the bot class. A utility classes generator 1320 can generate utility classes which are used by an entry class or bot class methods. The utility classes generator 1320 can generate, as output, Java classes. A data type generator 1322 can generate value types useful at runtime. The data type generator 1322 can generate, as output, Java classes. An expression generator 1324 can evaluate user inputs and generates compatible Java code, identifies complex variable mixed user inputs, inject variable values, and transform mathematical expressions. The expression generator 1324 can take, as input, user defined values and generates, as output, Java compatible expressions.

The JAR generator 1328 can compile Java source files, produces byte code and packs everything in a single JAR, including other child bots and file dependencies. The JAR generator 1328 can take, as input, generated Java files, resource files used during the bot creation, bot compiler dependencies, and command packages, and then can generate a JAR artifact as an output. The JAR cache manager 1330 can put a bot JAR in cache repository so that recompilation can be avoided if the bot has not been modified since the last cache entry. The JAR cache manager 1330 can take, as input, a bot JAR.

In one or more embodiment described herein command action logic can be implemented by commands 1201 available at the control room 1008. This permits the execution environment on a device 1010 and/or 1015, such as exists in a user session 1018, to be agnostic to changes in the command action logic implemented by a bot 1004. In other words, the manner in which a command implemented by a bot 1004 operates need not be visible to the execution environment in which a bot 1004 operates. The execution environment is able to be independent of the command action logic of any commands implemented by bots 1004. The result is that changes in any commands 1201 supported by the RPA system 1000, or addition of new commands 1201 to the RPA system 1000, do not require an update of the execution environment on devices 1010, 1015. This avoids what can be a time and resource intensive process in which addition of a new command 1201 or change to any command 1201 requires an update to the execution environment to each device 1010, 1015 employed in a RPA system. Take, for example, a bot that employs a command 1201 that logs into an on-online service. The command 1201 upon execution takes a Uniform Resource Locator (URL), opens (or selects) a browser, retrieves credentials corresponding to a user on behalf of whom the bot is logging in as, and enters the user credentials (e.g., username and password) as specified. If the command 1201 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 14:
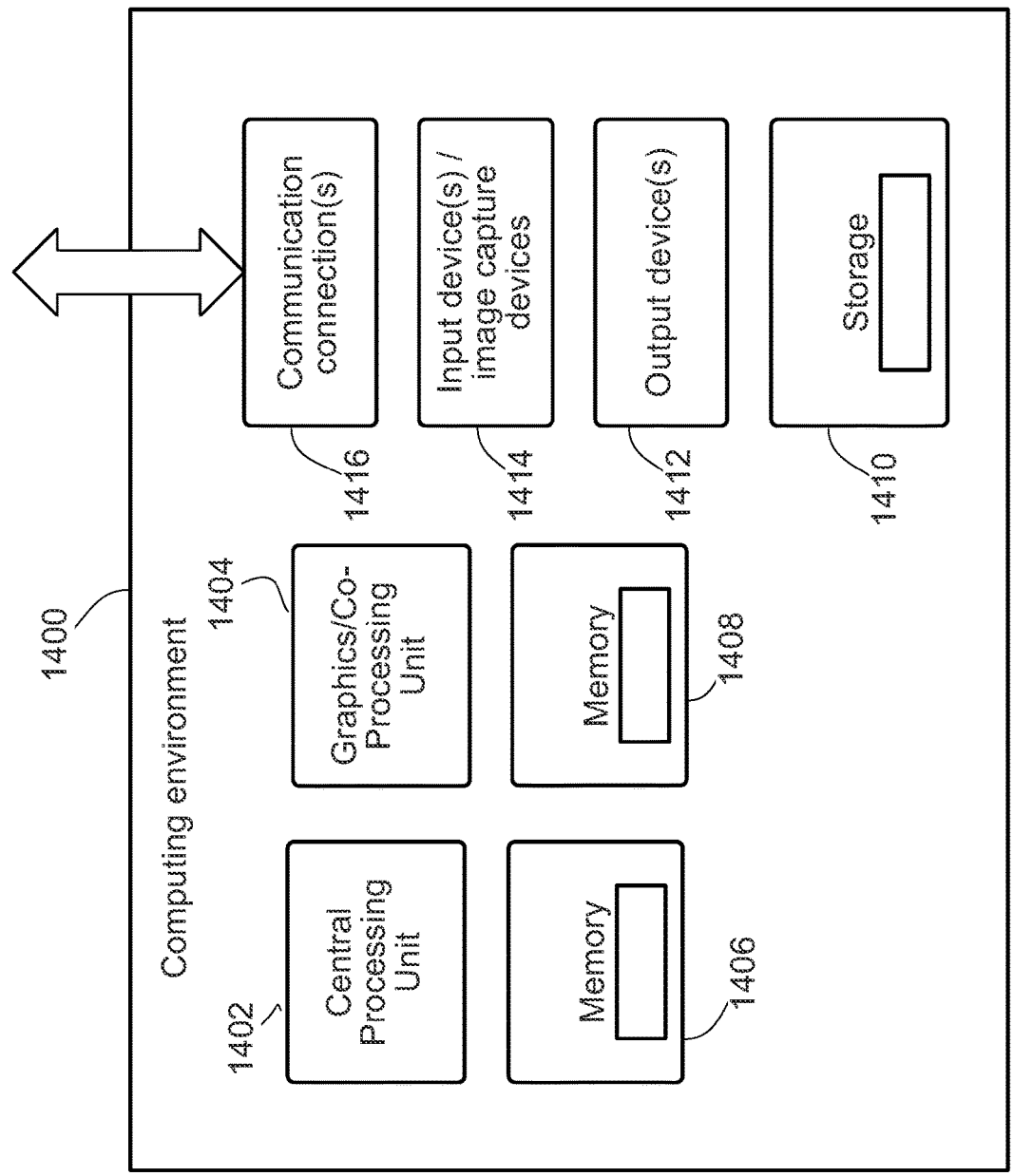
FIG. 14 illustrates a block diagram of an exemplary computing environment for an implementation of an RPA system, such as the RPA systems disclosed herein.

FIG. 14 illustrates a block diagram of an exemplary computing environment 1400 for an implementation of an RPA system, such as the RPA systems disclosed herein. The embodiments described herein may be implemented using the exemplary computing environment 1400. The exemplary computing environment 1400 includes one or more processing units 1402, 1404 and memory 1406, 1408. The processing units 1402, 1406 execute computer-executable instructions. Each of the processing units 1402, 1406 can be a general-purpose central processing unit (CPU), processor in an application-specific integrated circuit (ASIC) or any other type of processor. For example, as shown in FIG. 14, the processing unit 1402 can be a CPU, and the processing unit can be a graphics/co-processing unit (GPU). The tangible memory 1406, 1408 may be volatile memory (e.g., registers, cache, RAM), non-volatile memory (e.g., ROM, EEPROM, flash memory, etc.), or some combination of the two, accessible by the processing unit(s). In some embodiments may employ specialized hardware components to further increase the operating efficiency and speed with which the RPA system operates. The various components of exemplary computing environment 1400 may be rearranged in various embodiments, and some embodiments may not require nor include all of the above components, while other embodiments may include additional components, such as specialized processors and additional memory.

The exemplary computing environment 1400 may have additional features such as, for example, tangible storage 1410, one or more input devices 1414, one or more output devices 1412, and one or more communication connections 1416. An interconnection mechanism (not shown) such as a bus, controller, or network can interconnect the various components of the exemplary computing environment 1400. Typically, operating system software (not shown) provides an operating system for other software executing in the exemplary computing environment 1400, and coordinates activities of the various components of the exemplary computing environment 1400.

The tangible storage 1410 may be removable or non-removable, and includes magnetic disks, magnetic tapes or cassettes, CD-ROMs, DVDs, or any other medium which can be used to store information in a non-transitory way, and which can be accessed within the computing system 1400. The tangible storage 1410 can store instructions for the software implementing one or more features of a RPA system as described herein.

The input device(s) or image capture device(s) 1414 may include, for example, one or more of a touch input device such as a keyboard, mouse, pen, or trackball, a voice input device, a scanning device, an imaging sensor, touch surface, or any other device capable of providing input to the exemplary computing environment 1400. For multimedia embodiment, the input device(s) 1414 can, for example, include a camera, a video card, a TV tuner card, or similar device that accepts video input in analog or digital form, a microphone, an audio card, or a CD-ROM or CD-RW that reads audio/video samples into the exemplary computing environment 1400. The output device(s) 1412 can, for example, include a display, a printer, a speaker, a CD-writer, or any another device that provides output from the exemplary computing environment 1400.

The one or more communication connections 1416 can enable communication over a communication medium to another computing entity. The communication medium conveys information such as computer-executable instructions, audio or video input or output, or other data. The communication medium can include a wireless medium, a wired medium, or a combination thereof.

This application also references U.S. patent application Ser. No. 17/096,908, filed Nov. 12, 2020, entitled "AUTOMATED SOFTWARE ROBOT CREATION FOR ROBOTIC PROCESS AUTOMATION", which are expressly incorporated by reference herein. Additional details and description of processing of recordings, merging recordings, and producing software automation robots are described in this incorporated U.S. patent application Ser. No. 17/096,908.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for identifying and representing common user interactions with one or more application programs for use in a robotic process automation system, the method comprising:
    acquiring a plurality of recordings, the recordings include a series of user interactions with one or more application programs, the recordings being acquired via the robotic process automation system;
    identifying repeating sequences of user interactions within the recordings;
    selecting at least one of the identified repeating sequences that occurs more often;
    creating a first level pattern for the selected at least one of the identified repeating sequences;
    associating a descriptive label to the first level pattern created for the selected at least one of the identified repeating sequences;
    presenting, on a display device associated with the robotic process automation system, a visual representation of at least one of the recordings that includes at least the first level pattern, wherein the visual representation being presented presents the descriptive label for the first level pattern, the descriptive label being presented in place of the identified repeating sequence corresponding to the first level pattern; and
    subsequently, in response to a user request, modifying the visual representation of the at least one of the recordings being displayed such that the identified repeating sequence is then presented in place of the descriptive label corresponding thereto.

2. A computer-implemented method as recited in claim 1, wherein the first level pattern includes a pattern definition, the pattern definition being computer readable.

3. A computer-implemented method as recited in claim 2, wherein the pattern definition has a JSON format.

4. A computer-implemented method as recited in claim 1, wherein the pattern definition for the first level pattern includes at least a plurality of attributes.

5. A computer-implemented method as recited in claim 4, wherein the attributes include at least application name, action name, action value, and user interface ("UI") criteria name.

6. A computer-implemented method as recited in claim 1, wherein the user interactions are user interface interactions with the one or more application programs.

7. A computer-implemented method as recited in claim 6, wherein the user interface interactions include click-level events.

8. A computer-implemented method as recited in claim 1,
    wherein the first level pattern includes a pattern definition, the pattern definition being computer readable,
    wherein the pattern definition for the first level pattern includes at least a plurality of attributes, and
    wherein the user interactions are user interface interactions with the one or more application programs.

9. A computer-implemented method as recited in claim 8, wherein the selecting of the at least one of the identified repeating sequences is based on a number of times that the at least one of the identified repeating sequences occurs in the recordings.

10. A computer-implemented method as recited in claim 1, wherein the method comprises:
    storing the descriptive label and a pattern definition for the first level pattern to a central repository.

11. A computer-implemented method as recited in claim 1, wherein the creating of the first level pattern comprises:
    creating a computer-readable pattern description for the first level pattern; and
    storing the computer-readable pattern description to a central repository.

12. A computer-implemented method as recited in claim 1, wherein the method comprises:
    representing, within the robotic process automation system, at least one of the recordings that includes at least the first level pattern, wherein the representation replaces the identified repeating sequence corresponding to the first level pattern within the at least one of the recordings with the descriptive label for the first level pattern.

13. A computer-implemented method as recited in claim 1, wherein the method comprises:
    identifying at least one additional repeating sequence of user interactions and the first level pattern within the recordings;
    forming a second level pattern for the identified at least one additional repeating sequence; and
    associating a descriptive label to each of the second level patterns.

14. A computer-implemented method as recited in claim 13, wherein the method comprises:
    representing, within the robotic process automation system, at least one of the recordings that includes the second level pattern, wherein the representation is hierarchical and replaces the identified repeating sequence corresponding to the second level pattern within the at least one of the recordings and the first level pattern with the descriptive label for the second level pattern.

15. A computer-implemented method as recited in claim 1, wherein the selecting of the at least one of the identified repeating sequences is based on a number of times that the at least one of the identified repeating sequences occurs in the recordings.

16. A non-transitory computer readable medium including at least computer program code stored thereon for identifying and representing common user interactions with one or more application programs for use in a robotic process automation system, the computer program code being executable using at least one processor, the computer readable medium comprising:
- computer program code for acquiring a plurality of recordings, the recordings include a series of user interactions with one or more application programs, the recordings being acquired via the robotic process automation system;
- computer program code for identifying repeating sequences of user interactions within the recordings;
- computer program code for selecting at least one of the identified repeating sequences based on selection criteria;
- computer program code for creating a first level pattern for the at least one of the identified repeating sequences within the at least one of the identified repeating sequences;
- computer program code for associating a descriptive label to the first level patterns for each of the at least one identified repeating sequence;
- computer program code for presenting, on a display device associated with the robotic process automation system, a visual representation of at least one of the recordings that includes at least the first level pattern, wherein the visual representation being presented presents the descriptive label for the first level pattern, the descriptive label being presented in place of the identified repeating sequence corresponding to the first level pattern; and
- computer program code for subsequently, in response to a user request, modifying the visual representation of the at least one of the recordings being displayed such that the identified repeating sequence is then presented in place of the descriptive label corresponding thereto.

17. A non-transitory computer readable medium as recited in claim 16, wherein the computer program code for creating the first level pattern forms a pattern definition for the first level pattern, the pattern definition being computer readable, and the pattern definition specifies a sequence of steps or sub-tasks.

18. A non-transitory computer readable medium as recited in claim 17, wherein the pattern definition includes a plurality of attributes that at least in part define the first level pattern.

19. A non-transitory computer readable medium as recited in claim 16, wherein the computer readable medium comprises:
- computer program code for identifying at least one additional repeating sequence of user interactions within the recordings and the first level pattern within such of the recordings corresponding thereto;
- computer program code for creating a second level pattern for the identified at least one additional repeating sequence; and
- computer program code for associating a descriptive label to the second level pattern.

20. A non-transitory computer readable medium as recited in claim 19, wherein the computer program code for creating the second level pattern forms a pattern definition for the second level pattern, the pattern definitions being computer readable.

21. A non-transitory computer readable medium as recited in claim 16, wherein the selection criteria impose a minimum number of user interactions within the identified repeating sequence in order for the at least one of the identified repeating sequences to be selected.

22. A non-transitory computer readable medium as recited in claim 16, wherein the selection criteria impose a minimum number of occurrences that the at least one of the identified repeating sequences is to have within the recordings in order to be selected.

* * * * *